United States Patent
Fu et al.

(10) Patent No.: US 10,959,248 B2
(45) Date of Patent: Mar. 23, 2021

(54) METHOD AND APPARATUS FOR RECEIVING DATA IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN); Yingjie Zhang, Beijing (CN); Di Su, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/475,971

(22) PCT Filed: Jan. 4, 2018

(86) PCT No.: PCT/KR2018/000182
§ 371 (c)(1),
(2) Date: Jul. 3, 2019

(87) PCT Pub. No.: WO2018/128418
PCT Pub. Date: Jul. 12, 2018

(65) Prior Publication Data
US 2019/0357236 A1    Nov. 21, 2019

(30) Foreign Application Priority Data

Jan. 6, 2017 (CN) .......................... 2017 1 0009391

(51) Int. Cl.
*H04W 72/12* (2009.01)
*H04L 5/00* (2006.01)

(52) U.S. Cl.
CPC ......... *H04W 72/1242* (2013.01); *H04L 5/005* (2013.01); *H04L 5/0053* (2013.01); *H04W 72/121* (2013.01)

(58) Field of Classification Search
CPC ..... H04L 5/0007; H04L 5/0044; H04L 5/005; H04L 5/0053; H04W 72/121; H04W 72/1242
See application file for complete search history.

(56) References Cited

U.S. PATENT DOCUMENTS

| 2018/0027576 A1* | 1/2018 | Kowalski .......... H04W 72/0446 370/329 |
| 2018/0176935 A1* | 6/2018 | Li ..................... H04W 72/1289 |

(Continued)

OTHER PUBLICATIONS

ISA/KR, "International Search Report and Written Opinion of the International Searching Authority," Application No. PCT/KR2018/000182, dated Apr. 18, 2019, 8 pages.

(Continued)

*Primary Examiner* — Gary Mui

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present application provides a data receiving method. The method includes: when a category-1 service occupies resources scheduled for a category-2 service, a terminal receives data of the category-2 service according to information about scheduling of category-1 service data. According to the present application, resources of category-2 services can be reused for receiving category-1 service data to satisfy requirements for low delay of the category-1 services and increase the utility efficiency of resources of the category-2 services.

26 Claims, 14 Drawing Sheets

(56) References Cited

U.S. PATENT DOCUMENTS

| | | | |
|---|---|---|---|
| 2018/0184443 A1* | 6/2018 | Li | H04W 52/0235 |
| 2018/0184444 A1* | 6/2018 | Li | H04L 5/0094 |
| 2019/0173716 A1* | 6/2019 | Lyu | H04J 1/065 |
| 2019/0174440 A1* | 6/2019 | Kwak | H04W 56/0015 |
| 2019/0280841 A1* | 9/2019 | Fu | H04W 72/1289 |
| 2019/0327012 A1* | 10/2019 | Park | H04W 24/08 |
| 2020/0022112 A1* | 1/2020 | Yasukawa | H04W 72/02 |

OTHER PUBLICATIONS

Fujitsu, "DL control channel related to multiplexing eMBB and URLLC," R1-1611465, 3GPP TSG RAN WG1 Meeting #87, Reno, USA, Nov. 14-18, 2016, 4 pages.

KT Corp, et al., "Discussion on NR numerlology," R1-165525, 3GPP TSG RAN WG1 Meeting #85, Nanjing, China, May 23-27, 2016, 5 pages.

Sony, "Dynamic Resource Sharing for eMBB/URLLC in DL," R1-1611545, 3GPP TSG RAN WG1 Meeting #87, Lisbon, Portugal, Oct. 10-14, 2016, 5 pages.

ZTE, et al., "URLLC and eMBB frame structure and multiplexing," R1-1608957, 3GPP TSG-RAN WG1 Meeting #86bis, Lisbon, Portugal, Oct. 10-14, 2016, 7 pages.

ZTE, et al., "About URLLC/eMBB multiplexing," R1-1611288, 3GPP TSG RAN WG1 Meeting #87, Reno, USA, Nov. 14-18, 2016, 8 pages.

* cited by examiner

[Fig. 1]
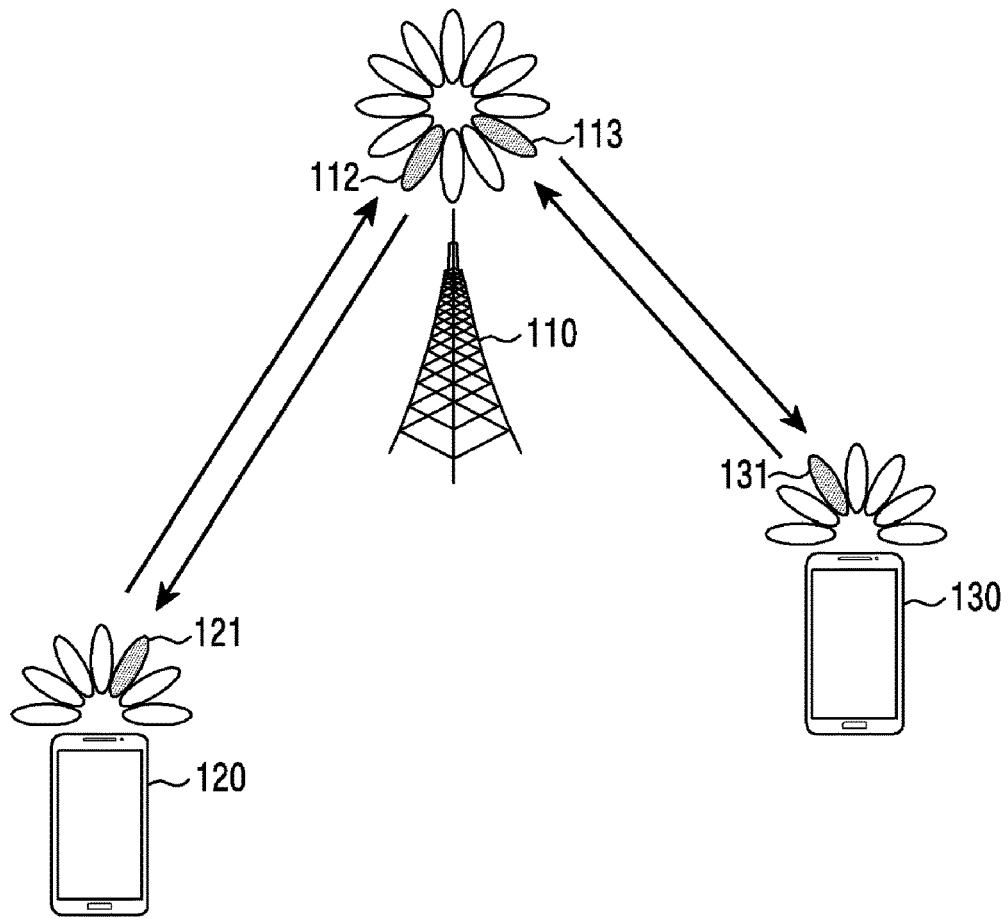
[Fig. 2]
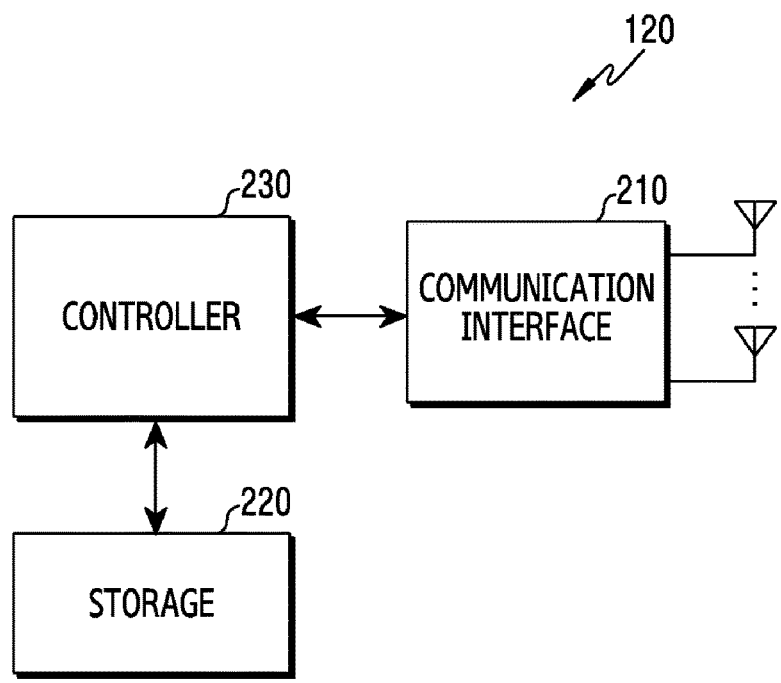

[Fig. 3]
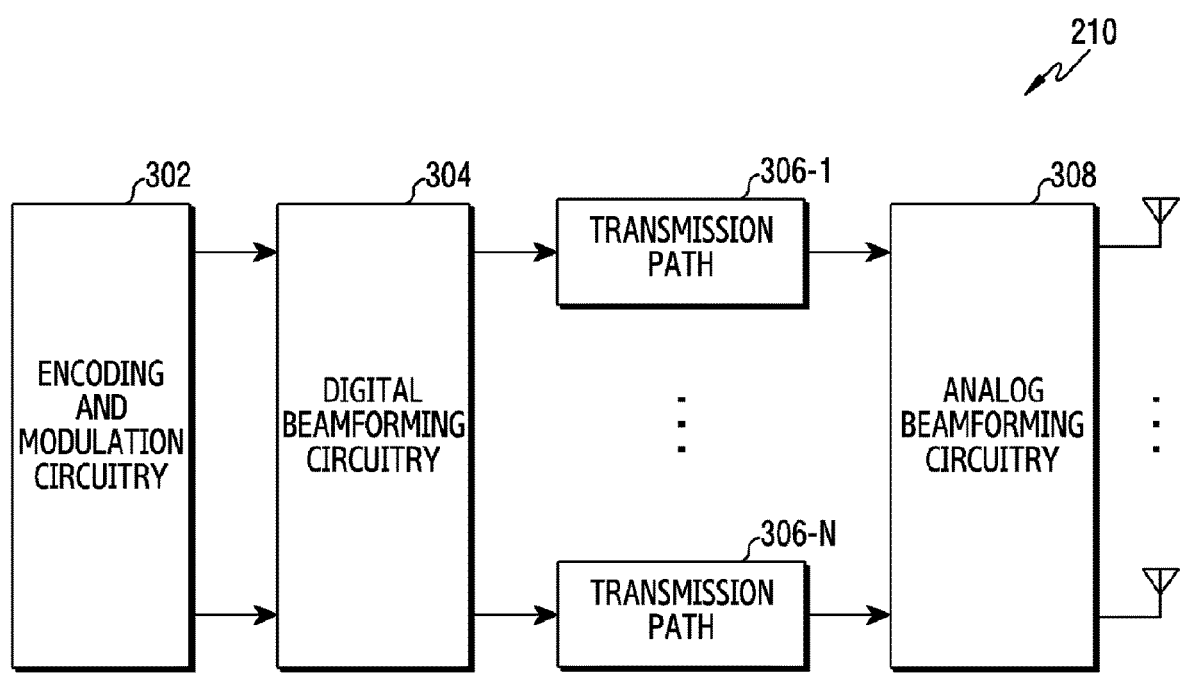

[Fig. 4]
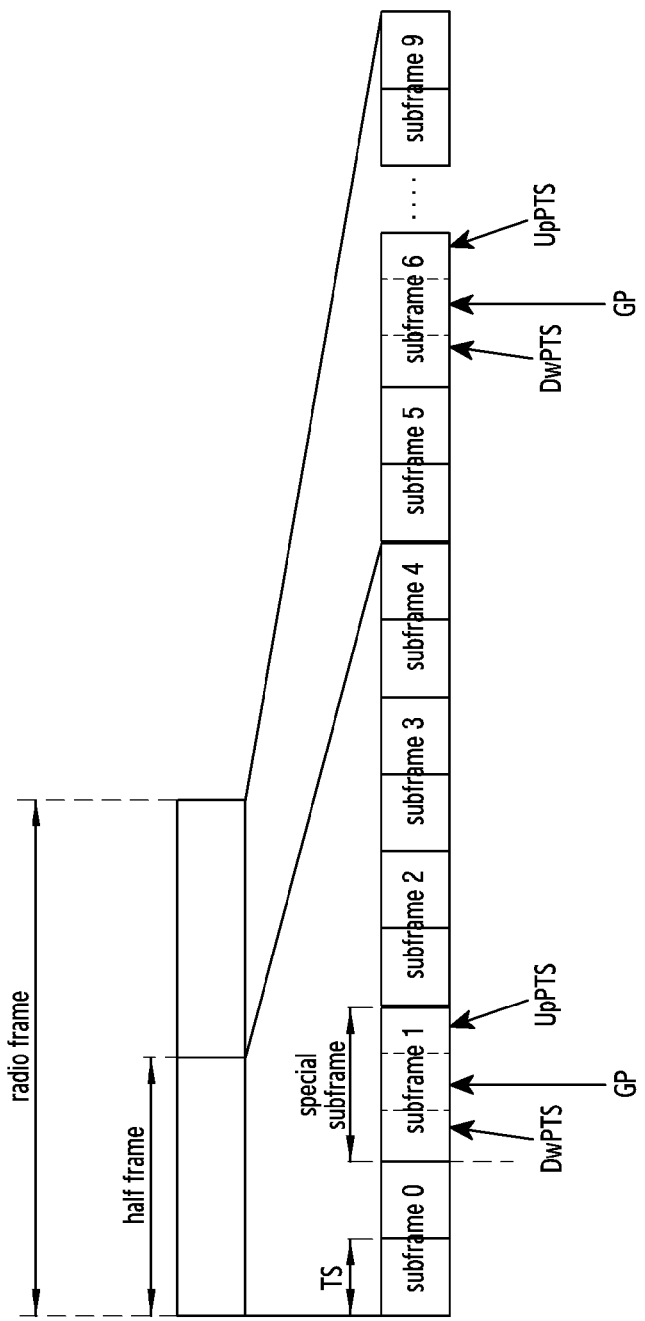

[Fig. 5]
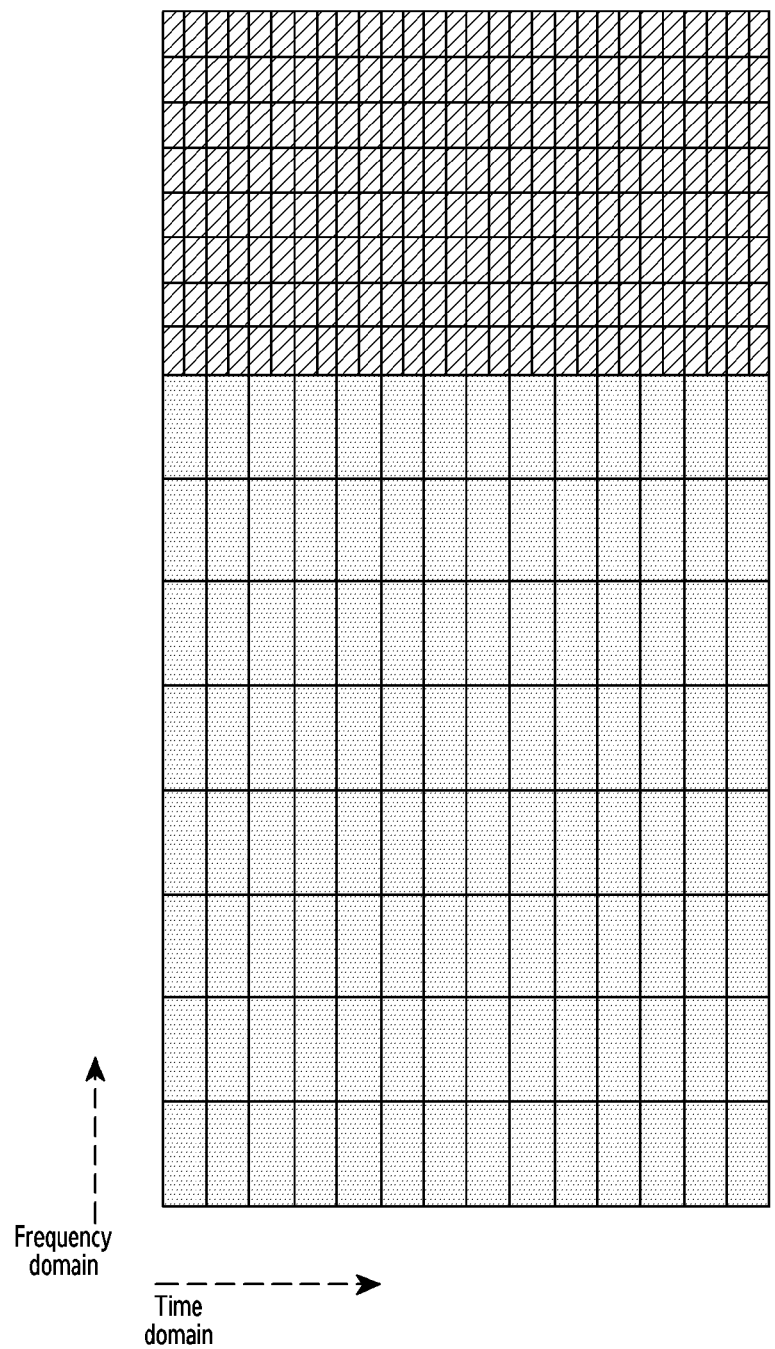

[Fig. 6]
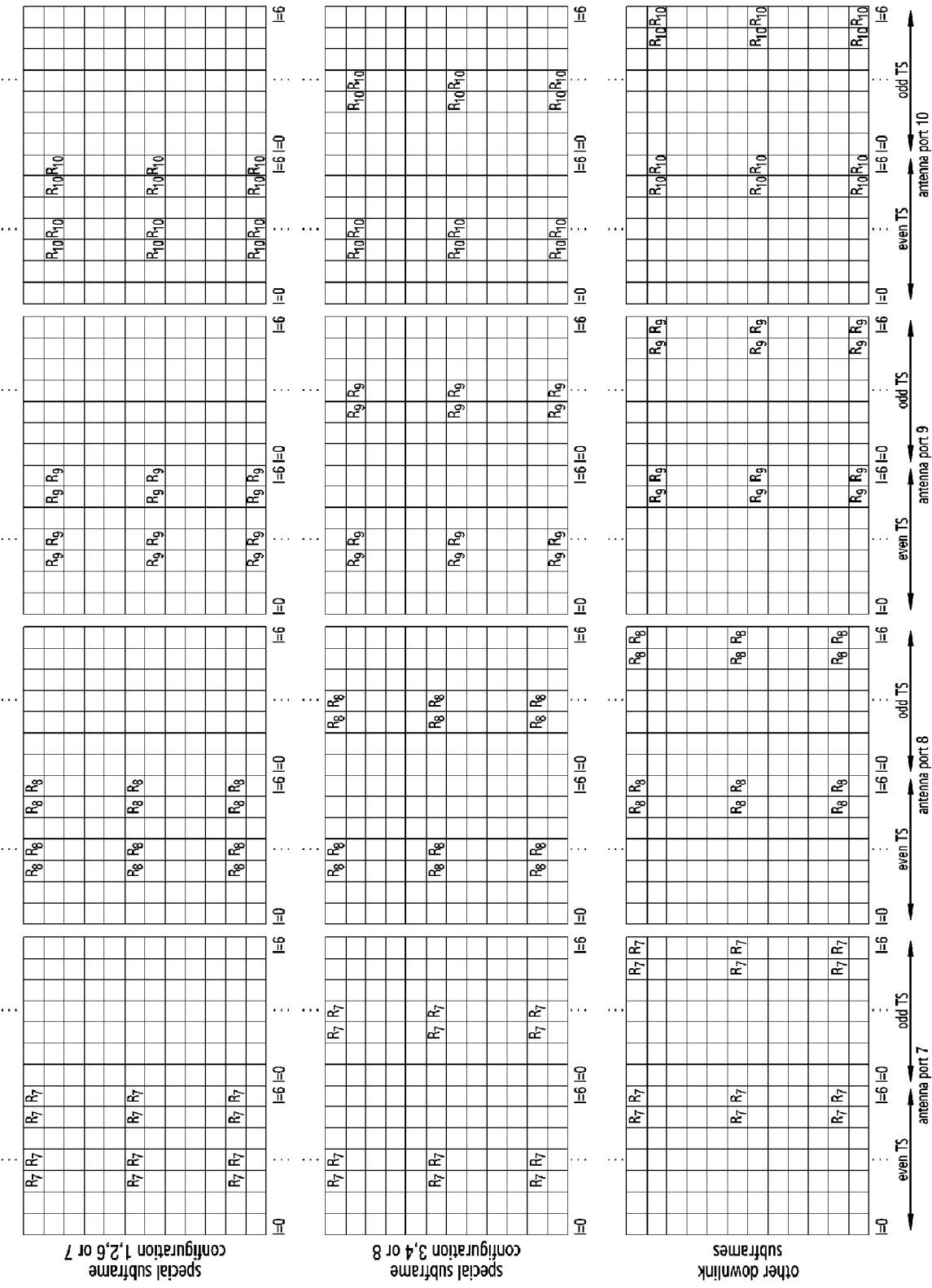

[Fig. 7]
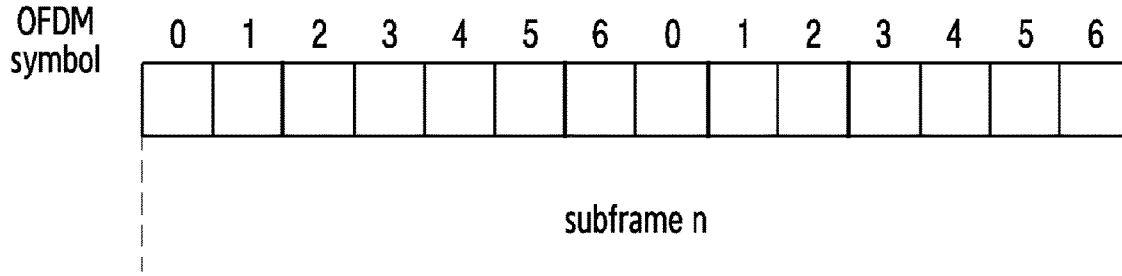
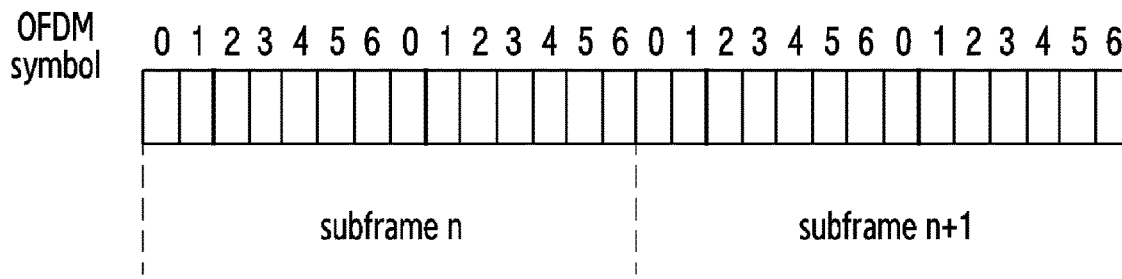
[Fig. 8]
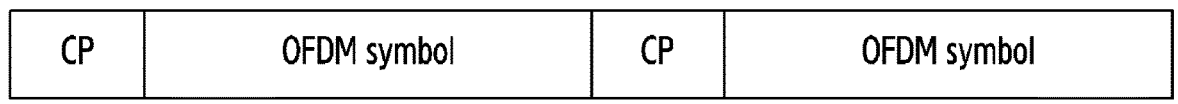
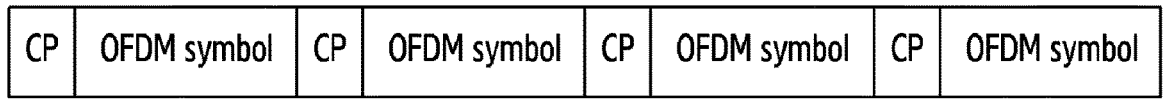

[Fig. 9]
subcarrier bandwidth : 15kHz, CP length : 4.67ms
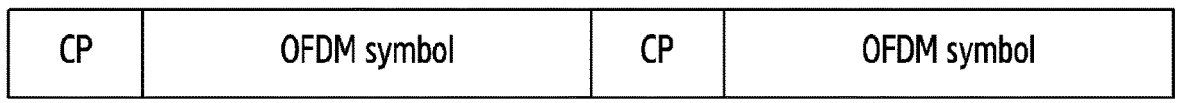
subcarrier bandwidth : 30kHz, CP length : 4.67ms
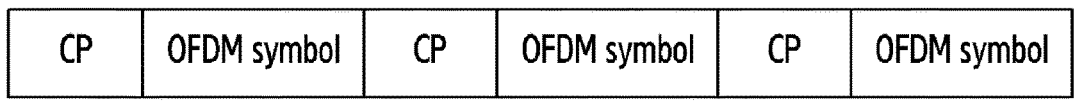
[Fig. 10]
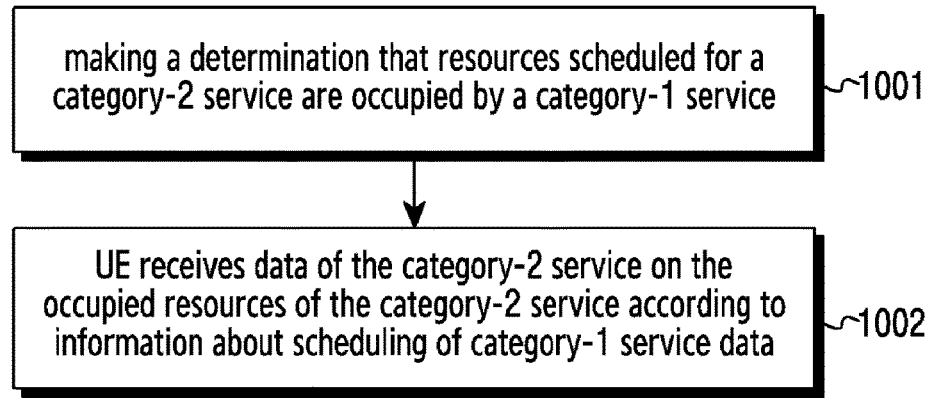

[Fig. 11]
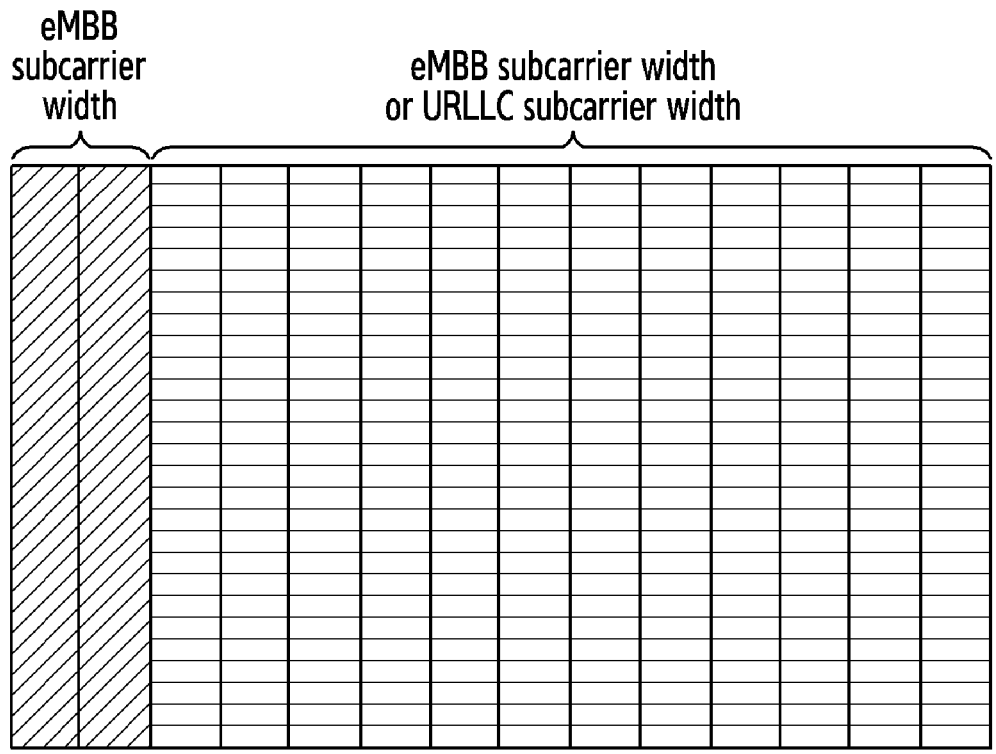
[Fig. 12]
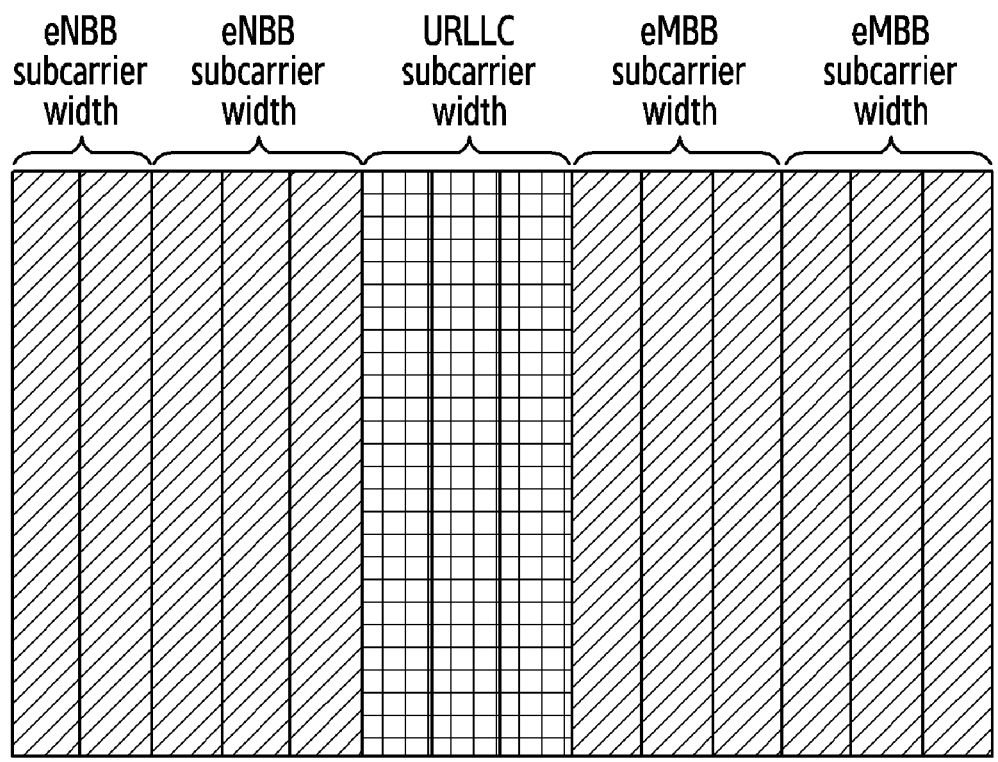

[Fig. 13]
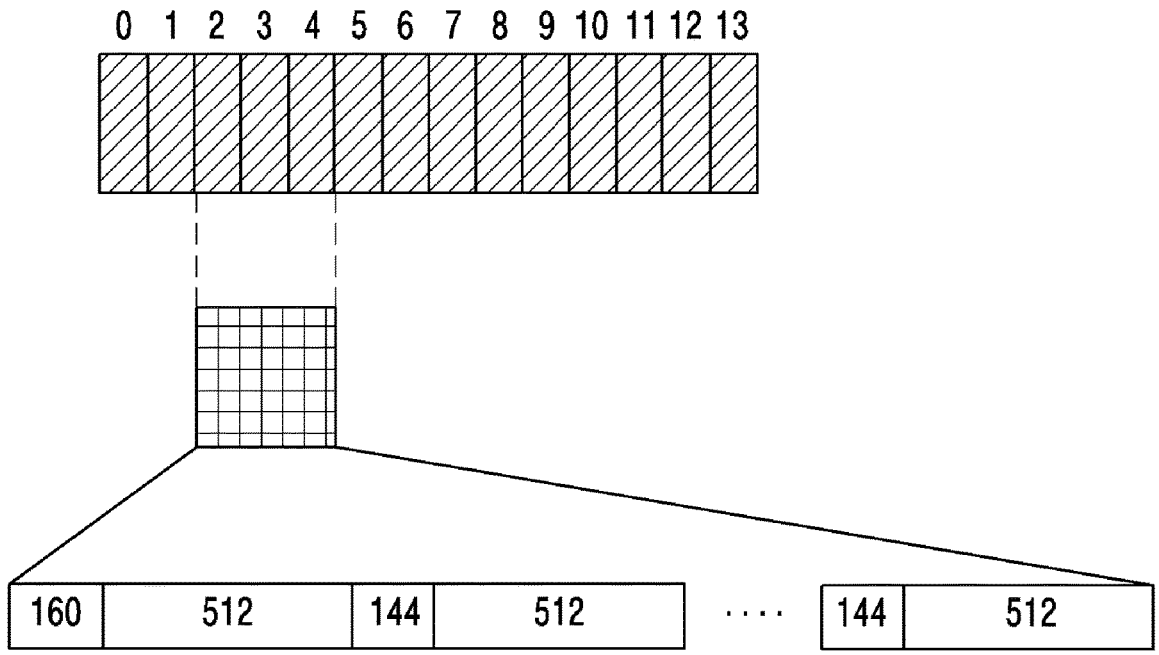
[Fig. 14]
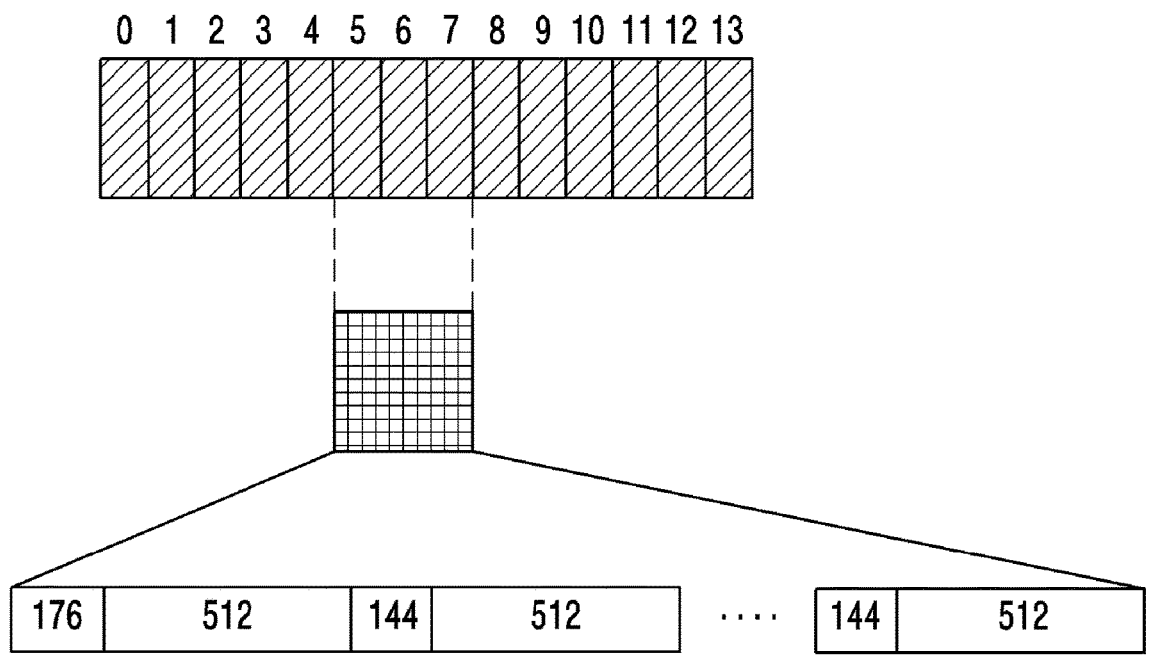

[Fig. 15]
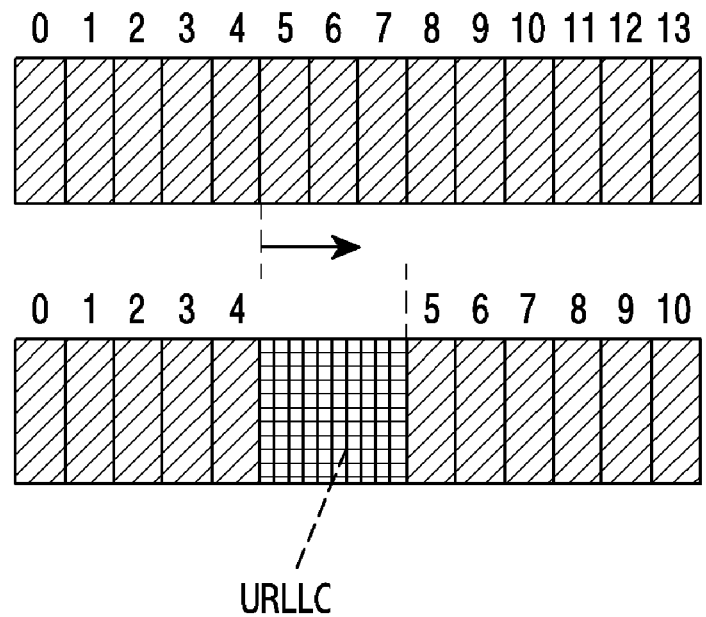
[Fig. 16]
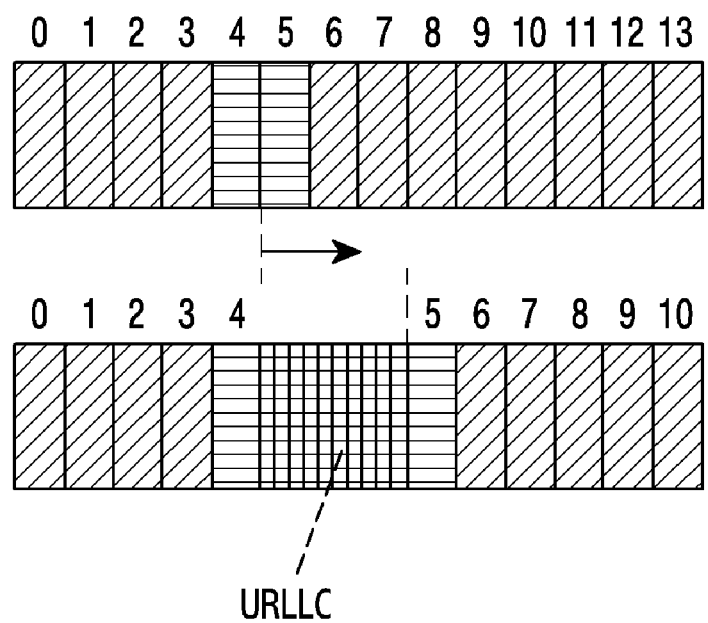

[Fig. 17]
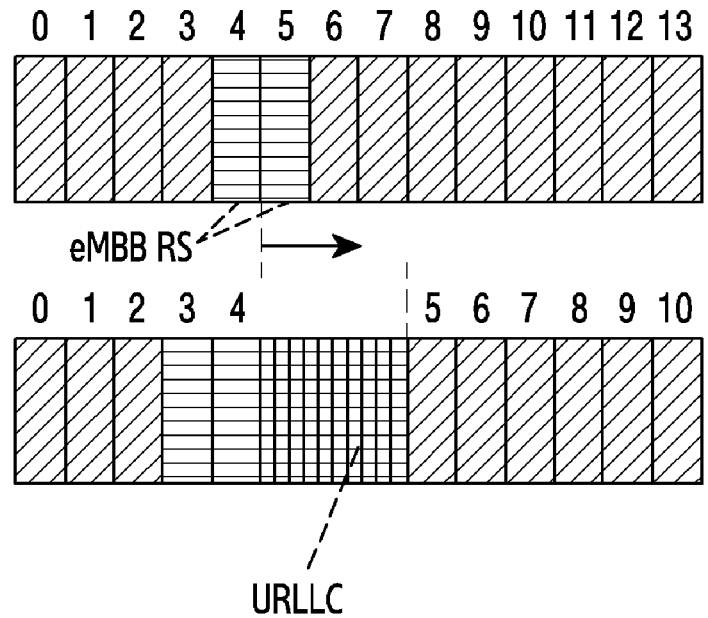
[Fig. 18]
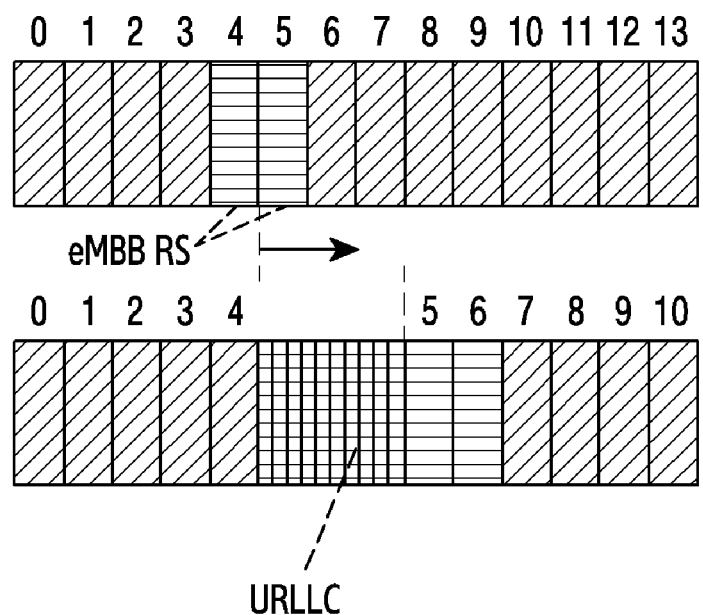

[Fig. 19]
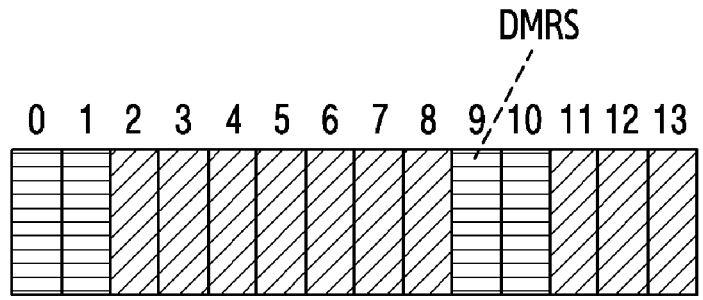
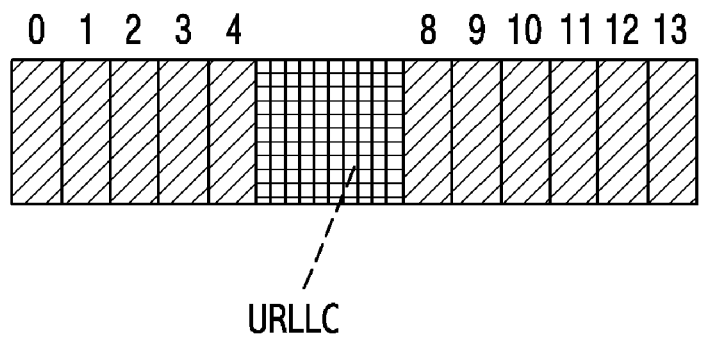
[Fig. 20]
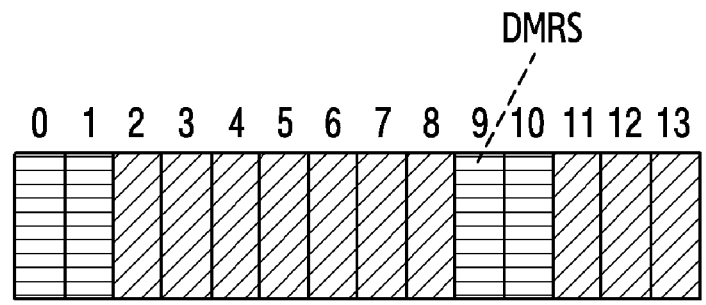
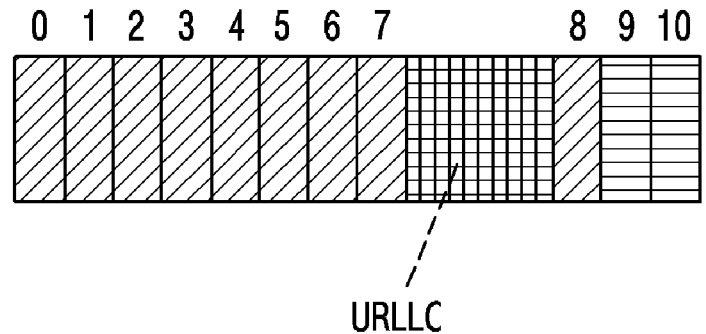

[Fig. 21]
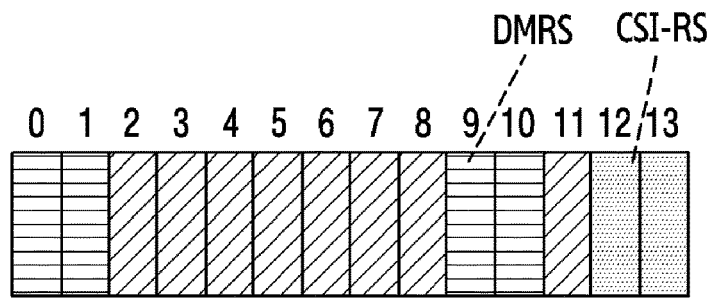
eMBB data scheduled on OFDM symbols 8, 9,10 is transmitted on OFDM symbols 11,12,13
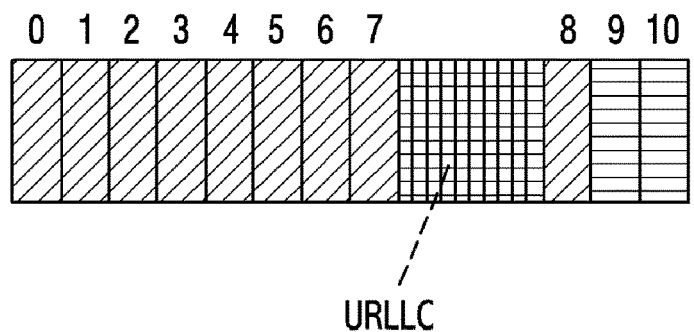
[Fig. 22]
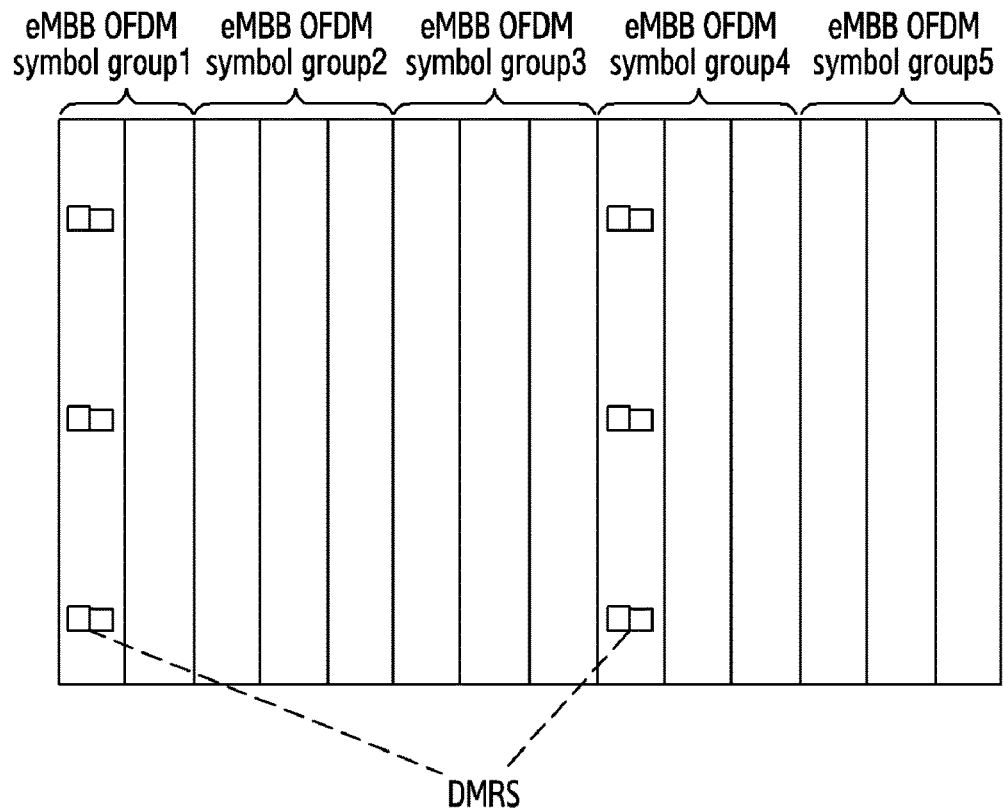

[Fig. 23]
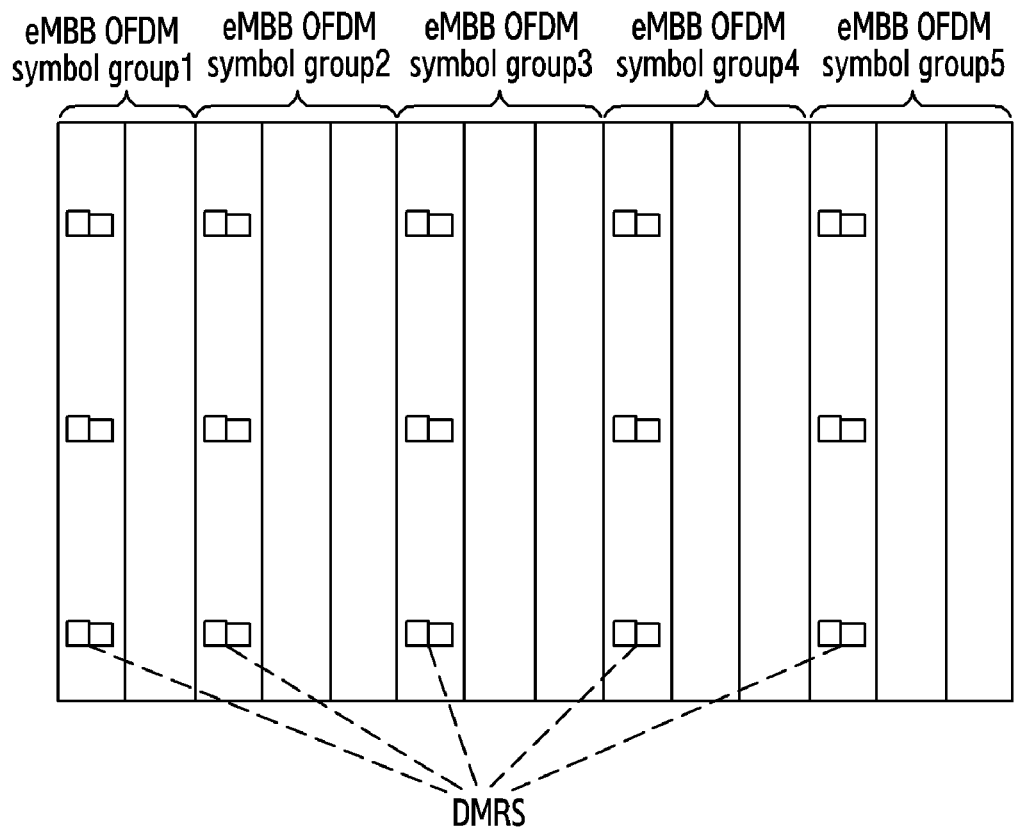
[Fig. 24]
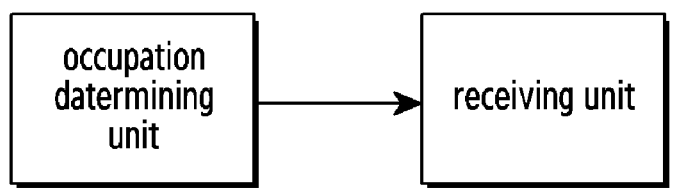
[Fig. 25]
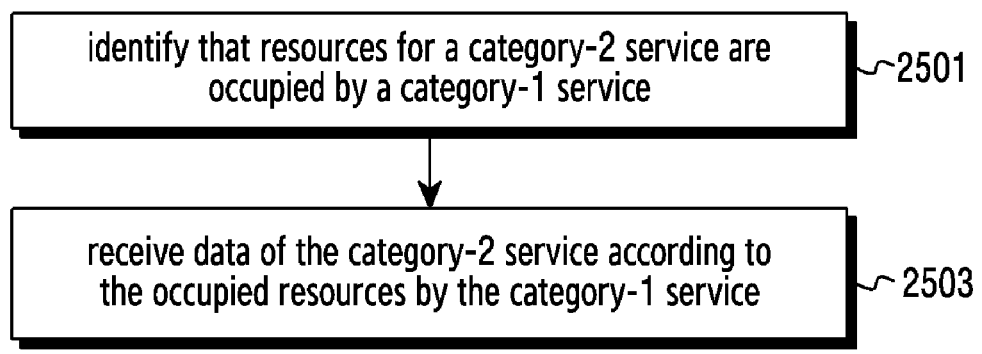

METHOD AND APPARATUS FOR RECEIVING DATA IN WIRELESS COMMUNICATION SYSTEM

CROSS-REFERENCE TO RELATED APPLICATIONS

This application is a 371 National Stage of International Application No. PCT/KR2018/000182, filed on Jan. 4, 2018, which claims priority to Chinese Patent Application No. 201710009391.7, filed Jan. 6, 2017, the disclosures of which are herein incorporated by reference in their entirety.

BACKGROUND

1. Field

The present invention relates to wireless communications, and particularly to a method and an apparatus for receiving data in a new radio (NR) system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, various communication schemes are discussed. For example, a communication scheme for receiving data by using resources scheduled for different service type is proposed. Furthermore, various discussions for receiving the data efficiently are underway.

SUMMARY

The present application provides a data receiving method and device, to enable services of a higher priority level of delay handling to occupy scheduled resources of a lower priority level, to better utilize resources of the service of lower priority level and to better satisfy the low-delay requirements of the service of higher priority level.

To attain the above objective, the present application provides the following technical mechanisms.

A data receiving method may include:
making a determination that resources scheduled for a category-2 service has been occupied a category-1 service; and
receiving, by a terminal, data of the category-2 service from the occupied resources of the category-2 service according to information about scheduling of category-1 service data.

Preferably, in a time domain unit of the scheduled resources of the category-2 service, N OFDM symbols use a subcarrier spacing of the category-2 service;
in a time domain unit of the scheduled resources of the category-2 service, the N OFDM symbols are designated into one group, OFDM symbols other than the N OFDM symbols are divided into M groups; for each group of OFDM symbols, if the group is occupied by a category-1 service, OFDM symbols of the group use a subcarrier spacing of the category-1 service; if the group is not occupied by a category-1 service, OFDM symbols of the group use a subcarrier spacing of the category-2 service; M and N are integers, the N OFDM symbols bear a pre-defined type of demodulation reference signal (DMRS) of the category-2 service, and OFDM symbols within one group uses the same subcarrier spacing.

Preferably, wherein the N OFDM symbols are not allowed to be occupied by a category-1 service, wherein receiving by the terminal data of the category-2 service from the occupied resources of the category-2 service according to information about scheduling of the category-1 service data comprises:
selecting at least one group of OFDM symbols from the M groups of OFDM symbols, and receiving the data of the category-2 service based on the selected group of OFDM symbols.

Preferably, the N is determined according to: an initial access signal detected, or an indication in system information, or configuration in higher layer signaling, or an indication in physical layer signaling, or pre-defined settings.

Preferably, when the category-2 service use the pre-defined type of DMRS, a group of OFDM symbols which includes OFDM symbols for transmitting the pre-defined type of DMRS is scheduled and is not allowed to be occupied by a category-1 service which uses a subcarrier spacing different from that used by the category-2 service.

Preferably, in a time domain unit of the scheduled resources of the category-2 service, all of OFDM symbols are divided into M groups, and for each group of OFDM symbols, if the group is occupied by a category-1 service, OFDM symbols of the group use a subcarrier spacing of the category-1 service; if the group is not occupied by a category-1 service, OFDM symbols of the group use a subcarrier spacing of the category-2 service; M is an integer, and OFDM symbols in one group use the same subcarrier spacing.

Preferably, when an arbitrary group of the M groups of OFDM symbols is occupied by the category-1 service, receiving the data of the category-2 service according to information about scheduling of category-1 service data may include:
not transmitting category-2 service data scheduled on the arbitrary group of OFDM symbols; transmitting category-2 service data scheduled on a group of OFDM symbols not occupied by a category-1 service; or
not transmitting category-2 service data scheduled on the arbitrary group of OFDM symbols and subsequent OFDM symbols; or not transmitting category-2 service data scheduled on the arbitrary group of OFDM symbols when the category-2 service data scheduled on the arbitrary group of OFDM symbols does not include a reference signal (RS); or using a subcarrier spacing of ultra-reliable low-latency communication (URLLC) for transmitting RS of a category-2 service scheduled on the arbitrary group of OFDM symbols when the category-2 service data scheduled on the arbitrary group of OFDM symbols includes a RS; or transmitting in turn category-2 service data that have been scheduled but not transmitted starting from the first group of OFDM symbols not occupied by a category-1 service subsequent to the arbitrary group of OFDM symbols; or transmitting in turn category-2 service data that have been scheduled on the arbitrary group of OFDM symbols and subsequent category-2 service data starting from the first group of OFDM symbols not occupied by a category-1 service after the arbitrary group of OFDM symbols when the data of the category-2 service scheduled on the arbitrary group of OFDM symbols includes a reference signal; or judging whether category-2 service data scheduled on the first group of OFDM symbols not occupied by a category-1 service subsequent to the arbitrary group of OFDM symbols includes a reference signal (RS) when the category-2 service data scheduled on the arbitrary group of OFDM symbols includes a reference signal, transmitting in turn category-2 service data that has been scheduled on the arbitrary group of OFDM symbols and subsequent category-2 service data starting from the first group of OFDM symbols when the category-2 service data scheduled on the first group of OFDM symbols does not include a reference signal; comparing a first priority level of a first RS scheduled on the first group of OFDM symbols with a second priority level of a second RS scheduled on the arbitrary group of OFDM symbols when the category-2 service data scheduled on the first group of OFDM symbols includes a RS; transmitting in turn category-2 service data scheduled on the arbitrary group of OFDM symbols and subsequent category-2 service data starting from the first group of OFDM symbols when the second priority level is higher than the first priority level; not transmitting the category-2 service data scheduled on the arbitrary group of OFDM symbols when the first priority level is higher than the second priority level.

Preferably, a position of an OFDM symbol for transmitting a time domain spread spectrum RS is adjusted so that the time domain spread spectrum RS is not transmitted on resources in which there is an interval larger than P when the category-2 service data scheduled on the arbitrary group of OFDM symbols include a time domain spread spectrum RS and the category-2 service data is adjusted from the arbitrary group of OFDM symbols to OFDM symbols not occupied by a category-1 service subsequent to the arbitrary group of OFDM symbols; wherein P is a positive integer.

Preferably, a group of OFDM symbols which includes OFDM symbols scheduled for transmitting a RS of category-2 service is not allowed to be occupied by URLLC; or a group of OFDM symbols scheduled for transmitting a pre-defined type of RS of a category-2 service is not allowed to be occupied by URLLC.

Preferably, each group of the M groups of OFDM symbols includes a DMRS, and category-2 service data transmitted on OFDM symbols of the same group is estimated and demodulated using a DMRS transmitted in the group.

Preferably, when an arbitrary group of the M groups of OFDM symbols is occupied by the category-1 service, receiving the data of the category-2 service according to information about scheduling of category-1 service data may include:

not transmitting category-2 service data scheduled on the arbitrary group;

transmitting category-2 service data scheduled on a group of OFDM symbols not occupied by a category-2 service.

Preferably, before receiving the category-2 service data according to information about scheduling of the category-1 service data, the method also includes making a determination on whether DMRS in the scheduled category-2 service data is in unit of OFDM symbol group according to higher layer signaling, or an indication in physical layer signaling, or an indication in MAC layer signaling.

Preferably, the RS of the category-2 service is DMRS and/or channel state information-reference signal (CSI-RS).

Preferably, the category-1 service is URLLC, the category-2 service is eMBB.

A data receiving device may include: an occupation determining unit and a receiving unit;

the occupation determining unit is configured for making a determination that resources scheduled for a category-2 service are occupied by a category-1 service; and the receiving unit is configured for receiving data of the category-2 service from the occupied resources of the category-2 service according to information about scheduling of category-1 service data.

It can be seen from the above that the present application provides a data receiving method. The method includes: when a category-1 service occupies resources scheduled for a category-2 service, a terminal receives data of the category-2 service according to scheduling situation of category-1 service data. Thus, resources for category-2 services can be reused for receiving data of category-1 services to satisfy requirements for low delay of the category-1 services and increase the utility efficiency of resources of the category-2 services.

Various embodiments of the present disclosure provide an improved system performance.

BRIEF DESCRIPTION OF THE DRAWINGS

FIG. 1 illustrates a wireless communication system according to various embodiments of the present disclosure;

FIG. 2 illustrates a terminal in the wireless communication system according to various embodiments of the present disclosure;

FIG. 3 illustrates the communication interface in the wireless communication system according to various embodiments of the present disclosure;

FIG. 4 is a schematic diagram illustrating a frame structure in an LTE TDD system;

FIG. 5 is a schematic diagram illustrating DMRS;

FIG. 6 is a schematic diagram illustrating OFDM symbol resources with different subcarrier spacing in a subcarrier;

FIG. 7 is a schematic diagram illustrating OFDM symbols with different subcarrier spacing and different time slot lengths;

FIG. 8 is a schematic diagram illustrating the length of CP changes with the size of subcarrier spacing;

FIG. 9 is a schematic diagram illustrating different sizes of subcarrier spacing with the same length of CP;

FIG. 10 is a flowchart illustrating a data receiving method in an NR system according to the present application;

FIG. 11 is a schematic diagram illustrating dividing OFDM symbol resources in a time slot according to embodiment one;

FIG. 12 is a schematic diagram illustrating dividing OFDM symbols in a time slot into groups according to embodiment one;

FIG. 13 is a first schematic diagram illustrating a length of OFDM symbol in a URLLC subcarrier spacing in a time slot according to embodiment one;

FIG. 14 is a second schematic diagram illustrating a length of OFDM symbol in a URLLC subcarrier spacing in a time slot according to embodiment one;

FIG. 15 is a schematic diagram illustrating transmitting eMBB data scheduled on resources occupied by URLLC in subsequent resources;

FIG. 16 is a schematic diagram illustrating a situation where time domain spread spectrum RS cannot be transmitted;

FIG. 17 is a first schematic diagram illustrating transmission of time domain spread spectrum RS;

FIG. 18 is a second schematic diagram illustrating transmission of time domain spread spectrum RS;

FIG. 19 is a schematic diagram illustrating not transmitting eMBB data scheduled on resources occupied by URLLC in accordance with method three and method four;

FIG. 20 is a schematic diagram illustrating transmission of eMBB RS scheduled on resources occupied by URLLC in accordance with method three;

FIG. 21 is a schematic diagram illustrating transmission of eMBB RS scheduled on resources occupied by URLLC in accordance with method four;

FIG. 22 is a first schematic diagram illustrating transmission of eMBB RS in accordance with embodiment three;

FIG. 23 is a second schematic diagram illustrating transmission of eMBB RS in accordance with embodiment three;

FIG. 24 is a schematic diagram illustrating modules of a data receiving device in accordance with the present application; and FIG. 25 is another flowchart illustrating a data receiving method in an NR system according to the present application.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for receiving data in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the terminal in the wireless communication system according to various embodiments of the present disclosure. A structure exemplified at FIG. 2 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 2, the terminal 120 includes a communication interface 210, a storage unit 220, and a controller 230.

The communication interface 210 performs functions for transmitting/receiving a signal through a wireless channel. For example, the communication interface 210 performs a function of conversion between a baseband signal and bitstreams according to the physical layer standard of the system. For example, in data transmission, the communication interface 210 generates complex symbols by encoding and modulating transmission bitstreams. Also, in data reception, the communication interface 210 reconstructs reception bitstreams by demodulating and decoding the baseband signal. In addition, the communication interface 210 upconverts the baseband signal into an RF band signal, transmits the converted signal through an antenna, and then down-converts the RF band signal received through the antenna into the baseband signal. For example, the communication interface 210 may include a transmission filter, a reception filter, an amplifier, a mixer, an oscillator, a DAC, and an ADC.

Further, the communication interface 210 may include a plurality of transmission/reception paths. In addition, the communication interface 210 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 210 may include a plurality of RF chains. The communication interface 210 may perform beamforming.

The communication interface 210 transmits and receives the signal as described above. Accordingly, the communication interface 210 may be referred to as a "transmitter," a "receiver," or a "transceiver." Further, in the following description, transmission and reception performed through the wireless channel is used to have a meaning including the processing performed by the communication interface 210 as described above.

The storage unit 220 stores a basic program, an application, and data such as setting information for the operation of the terminal 120. The storage unit 220 may include a volatile memory, a non-volatile memory, or a combination of volatile memory and non-volatile memory. Further, the storage unit 220 provides stored data in response to a request from the controller 230.

The controller 230 controls the general operation of the terminal 120. For example, the controller 230 transmits and receives a signal through the communication interface 210. Further, the controller 230 records data in the storage unit 220 and reads the recorded data. The controller 230 may performs functions of a protocol stack that is required from a communication standard. According to another implementation, the protocol stack may be included in the communication interface 210. To this end, the controller 230 may include at least one processor or microprocessor, or may play the part of the processor. Further, the part of the communication interface 210 or the controller 230 may be referred to as a communication processor (CP).

According to exemplary embodiments of the present disclosure, the controller 330 may identify that resources scheduled for a category-2 service are occupied by a category-1 service and receive data of the category-2 service from the occupied resources of the category-2 service according to information about scheduling of category-1 service data. For example, the controller 230 may control the terminal to perform operations according to the exemplary embodiments of the present disclosure.

FIG. 3 illustrates the communication interface in the wireless communication system according to various embodiments of the present disclosure. FIG. 3 shows an example for the detailed configuration of the communication interface 210 of FIG. 2. More specifically, FIG. 3 shows elements for performing beamforming as part of the communication interface 210 of FIG. 2.

Referring to FIG. 3, the communication interface 210 includes an encoding and circuitry 302, a digital circuitry 304, a plurality of transmission paths 306-1 to 306-N, and an analog circuitry 308.

The encoding and circuitry 302 performs channel encoding. For the channel encoding, at least one of a low-density parity check (LDPC) code, a convolution code, and a polar code may be used. The encoding and circuitry 302 generates modulation symbols by performing constellation mapping.

The digital circuitry 304 performs beamforming for a digital signal (for example, modulation symbols). To this end, the digital circuitry 304 multiples the modulation symbols by beamforming weighted values. The beamforming weighted values may be used for changing the size and phrase of the signal, and may be referred to as a "precoding matrix" or a "precoder." The digital circuitry 304 outputs the digitally beamformed modulation symbols to the plurality of transmission paths 306-1 to 306-N. At this time, according to a multiple input multiple output (MIMO) transmission scheme, the modulation symbols may be multiplexed, or the same modulation symbols may be provided to the plurality of transmission paths 306-1 to 306-N.

The plurality of transmission paths 306-1 to 306-N convert the digitally beamformed digital signals into analog signals. To this end, each of the plurality of transmission paths 306-1 to 306-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 306-1 to 306-N provide independent signal processing processes for a plurality of streams generated through the digital beamforming. However, depending on the implementation, some of the elements of the plurality of transmission paths 306-1 to 306-N may be used in common.

The analog circuitry 308 performs beamforming for analog signals. To this end, the digital circuitry 304 multiples the analog signals by beamforming weighted values. The beamformed weighted values are used for changing the size and phrase of the signal. More specifically, according to a connection structure between the plurality of transmission paths 306-1 to 306-N and antennas, the analog circuitry 308 may be configured in various ways. For example, each of the plurality of transmission paths 306-1 to 306-N may be connected to one antenna array. In another example, the plurality of transmission paths 306-1 to 306-N may be connected to one antenna array. In still another example, the plurality of transmission paths 306-1 to 306-N may be adaptively connected to one antenna array, or may be connected to two or more antenna arrays.

LTE (Long Term Evolution) supports two duplexing modes, i.e. FDD (Frequency Division Duplexing) and TDD (Time Division Duplexing). Transmission in a TDD system includes: transmission from a base station to a UE (User Equipment) (referred to as downlink transmission) and transmission from a UE to a base station (referred to as uplink transmission). In a TDD system, uplink transmission and downlink transmission are performed on the same carrier at different time. In an FDD system, uplink transmission and downlink transmission are performed on different carriers.

FIG. 4 is a schematic diagram illustrating a conventional structure of a frame in an LTE TDD system. Each radio frame has a length of 10 ms, and is divided uniformly into two half-frames each having a length of 5 ms. Each half-frame includes 8 time slots of 0.5 ms and 3 special fields of 1 ms, i.e. DwPTS (Downlink pilot time slot), GP (Guard period) and UpPTS (Uplink pilot time slot). Each subframe is composed of two consecutive time slots.

According to the frame structure as shown in FIG. 4, in every 10 ms, 10 subframes are shared by uplink and downlink. Each subframe may be allocated to uplink or downlink, and a subframe allocated to uplink is referred to as an uplink subframe, a subframe allocated to downlink referred to as a downlink subframe. TDD systems support 7 types of uplink-downlink configurations as shown in Table 1, where D represents downlink subframe, U represents uplink subframe, S represents special subframes in the 3 special fields. Each subframe includes 14 Orthogonal Frequency Division Multiplexing (OFDM) symbols. A subcarrier spacing (SCS) is 15 kHz. Each physical resource block (PRB) includes 12 subcarriers, and has a frequency domain width of 180 kHz.

TABLE 1

LTE TDD UL/DL configuration

| Configuration serial number | Switch-point periodicity | sub-frame index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Downlink data is transmitted through a physical downlink shared channel (PDSCH). Hybrid automatic retransmission request-acknowledgement (HARM) information of the PDSCH is transmitted in a physical uplink shared channel (PUSCH) or physical uplink control channel (PUCCH). Uplink data is transmitted through a physical uplink shared channel (PUSCH). PDSCH and PUSCH is scheduled by PDCCH/EPDCCH.

Channel estimation of demodulated PDSCH data may be performed using demodulation reference signal (DMRS). FIG. 5 is a schematic diagram illustrating conventional configurations of DMRS antenna ports 7 and 8.

Due to differences in carrier frequencies used by UEs for transmitting data, movement speeds of UEs, sizes of cells, and requirements for service delay and reliability, different subcarrier spacing may be used for data transmission, and different lengths of cyclic prefix (CP) may be used by OFDM symbols for data transmission. Different subcarrier spacing of OFDM symbols of physical resources or different CP lengths is called different numerology. FIG. 6 is a schematic diagram illustrating a carrier including resources of OFDM symbols whose subcarrier spacing are 15 KHz and 30 kHz respectively. In addition, since subcarrier spacing of OFDM symbols are different, the time slots may also have different lengths. As shown in FIG. 7, when the subcarrier spacing of OFDM symbols is 15 kHz, the time slot length is 1 ms; when the subcarrier spacing of OFDM symbols is 30 kHz, the time slot length is 0.5 ms. Each time slot has the same number of OFDM symbols, i.e., 14 OFDM symbols. The CP length is inversely proportional to the width of OFDM subcarrier, i.e., when the subcarrier spacing of OFDM symbols is 15 kHz, the CP length is 4.67 ms; when the subcarrier spacing of OFDM symbols is 30 kHz, the CP length is 2.34 ms, and the overhead of the CP does not change, i.e., the ratio of time-frequency resources for transmitting CP to the time-frequency resources for transmitting data does not change. As shown in FIG. 8, the overhead of the CP refers to the ratio of the length of a CP to the length of an OFDM symbol. Or, the width of OFDM subcarrier is changed and the length of the CP does not change, i.e., when the subcarrier spacing of OFDM symbols is 15 kHz, the length of CP is 4.67 ms; when the subcarrier spacing of OFDM symbols is 30 kHz, the length of CP is still 4.67 ms, i.e., the overhead of the CP is increased, as shown in FIG. 9.

In an NR system, a type of service, which is temporarily named as Ultra Reliability Low Latency Communication (URLLC), has high requirements for delay, and is better transmitted using a numerology with a large subcarrier spacing, e.g., a numerology having a subcarrier spacing of 60 kHz. Another type of service, which is temporarily named as Enhanced Mobile BroadBand (eMBB), does not have high requirements for delay, and can be transmitted using numerologies having smaller subcarrier spacing, e.g., a numerology having a subcarrier spacing of 15 kHz. URLLC has a higher level of priority than eMBB.

But in the same propagation environment in the same serving cell, since delay expansions are the same, the lengths of CP should be almost the same despite different subcarrier spacing, so that inter-symbol interference can be eliminated. When the lengths of CP are almost the same and the lengths of OFDM symbols are different, a CP of a short OFDM symbol is called an extended CP.

In order to make the objectives, technical schemes and merits of the present application clearer, a detailed description of the present application is hereinafter given with reference to specific embodiments.

FIG. 10 is a flowchart illustrating a preferred data receiving method in an NR system according to the present application. The method may include the following procedures.

In step 1001, A determination is made that resources scheduled for a category-2 service has been occupied by a category-1 service.

The category-1 service generally has a higher priority level over the category-2 service regarding delay requirements, thus the category-1 service may occupy resources scheduled for the category-2 service in order to use resources of the category-2 service effectively and to satisfy delay requirements of the category-2 service.

In step 1002, a UE receives data of the category-2 service from the resources of the category-2 service that has been occupied according to information about scheduling of category-1 service data.

The category-2 service is generally received from a time domain unit which includes the occupied resources of the category-2 service according to information about scheduling of the category-1 service data. The time domain unit may be a time slot or a sub frame, or the like. The UE may receive the category-2 service data by: determining a transmission manner of the category-2 service according to information about scheduling of the category-1 service data and receiving the category-2 service data transmitted on a time domain unit corresponding to the determined transmission manner.

Typically, the category-1 service may be temporarily called URLLC service, and the category-2 service may be temporarily called eMBB service. Of course, the services may be other services. The following takes a URLLC service occupies scheduled eMBB resources as an example. The processing method of the present application does not limited to URLLC and eMBB.

The eMBB service may use a subcarrier spacing of 15 kHz, 30 kHz, 60 kHz according to the needs. The URLLC service may use a subcarrier spacing of 60 kHz to reduce processing delay. As such, eMBB and URLLC may use different subcarrier spacing or the same subcarrier spacing. The following takes eMBB and URLLC use different subcarrier spacing as an example. The processing manner may also be applied to situations where eMBB and URLLC use the same subcarrier spacing.

The mechanism of the present disclosure is hereinafter described in detail with reference to three preferred embodiments.

Embodiment One

URLLC is generally in bursts and has high requirement for delay, thus situations may occur that already-scheduled eMBB resources are occupied by URLLC. Different subcarrier spacing may be used, thus the URLLC and the eMBB may have different lengths of OFDM symbols. The subcarrier spacing used by eMBB may be obtained by monitoring initial access signal or from system information indication or from semi-configuration of higher layer signaling or from pre-configured information. The subcarrier spacing of eMBB does not change within a time slot, e.g., using a subcarrier spacing of 15 kHz. In this embodiment, the subcarrier spacing of some eMBB resources does not change, and the subcarrier spacing of the other eMBB resources may change when occupied by URLLC.

In one time slot, N OFDM symbols (e.g., the first N OFDM symbols, N is a positive integer that may be obtained by monitoring an initial access signal or from system information indication or from configuration by higher layer signaling or from indication of physical layer signaling or from pre-configured information of a protocol, e.g., N is 2, the N OFDM symbols are also obtained using eMBB subcarrier spacing) use the subcarrier spacing of the eMBB (e.g., a subcarrier spacing of 15 kHz). RS of the eMBB may be transmitted in the N OFDM symbols. In the area of the N OFDM symbols, a solution is not transmitting URLLC, and another solution is transmitting URLLC. When URLLC is transmitted, the URLLC is transmitted in the subcarrier spacing of eMBB. N is a positive integer. The N OFDM symbols include resources for transmitting DMRS of a pre-defined type. The OFDM symbols use the subcarrier spacing of the eMBB, i.e., the subcarrier bandwidth of the OFDM symbols is the subcarrier bandwidth of the eMBB resources. The DMRS of the pre-defined type may be the basic DMRS.

OFDM symbols other than the N OFDM symbols may use the subcarrier spacing of the eMBB if transmitted is the eMBB, or use the subcarrier spacing of the URLLC (e.g., the subcarrier spacing is 60 kHz, the subcarrier spacing of the URLLC is configured by higher layer signaling, or indicated by system information, or indicated by physical layer signaling, or pre-defined by a protocol) if transmitted is the URLLC. For example, as shown in FIG. 11, within a time slot, OFDM symbols other than the N OFDM symbols may be divided into M groups. Each group includes Lm OFDM symbols. OFDM symbols within one group has the same subcarrier spacing. M is a positive integer. The OFDM symbols may be divided equally or unequally.

After a time slot adopts the above structure, if eMBB uses a preposed DMRS (Demodulated Reference Signal), the group of OFDM symbols bearing the preposed RS of the eMBB will not be occupied by URLLC services transmitted using different subcarrier spacing. For example, an exemplary structure is: the first 2 OFDM symbols adopts the subcarrier spacing of 15 kHz, subsequent 12 OFDM symbols are divided into 4 groups, and each group includes 3 OFDM symbols (this number is obtained when the subcarrier spacing is 15 kHz, if the subcarrier spacing is changed, the number of OFDM symbols will also change). Within each group, OFDM symbols may transmit eMBB, may also transmit URLLC. The change in subcarrier spacing is in unit of group, i.e., OFDM symbols in one group have the same subcarrier spacing, as shown in FIG. 12. For example, if OFDM symbols having a subcarrier spacing of 60 kHz are transmitted in a group composed of 3 OFDM symbols (i.e., OFDM symbols obtained according to the subcarrier spacing of the eMBB) and use extended CP, i.e., the CP length when using the subcarrier spacing of 60 kHz is the same with the CP length when using the subcarrier spacing of 15 kHz, such a group includes 10 OFDM symbols using a subcarrier spacing of 60 kHz, each OFDM symbol has a length of 512 sampling points, the first OFDM symbol has a CP length of 160 sampling points, and the other 9 OFDM symbols have a CP length of 144 sampling points. As shown in FIG. 13, such 10 OFDM symbols with a subcarrier spacing of 60 kHz include 6576 sampling points, and the 3 OFDM symbols with a subcarrier spacing of 15 kHz also include 6576 sampling points. Alternatively, the length of the CP of each of the first OFDM symbol and the sixth OFDM symbol is 152 sampling points, and the length of the CP of each of the other 8 OFDM symbols is 144 sampling points. The 3 OFDM symbols, i.e., OFDM symbols 5, 6, 7, with a subcarrier spacing of 15 kHz include 6592 sampling points, such a group of OFDM symbols include 10 OFDM symbols with a subcarrier spacing of 60 kHz, and each OFDM symbol has a length of 512 sampling points. The first OFDM symbol has a CP length of 176 sampling points, the other 9 OFDM symbols each has a CP length of 144 sampling points, as shown in FIG. 14. Alternatively, the first OFDM symbol and the sixth OFDM symbol each has a CP length of 160 sampling points, and the other 8 OFDM symbols each has a CP length of 144 sampling points. The 10 OFDM symbols may form a URLLC time slot (mini-slot) or N time slots (mini-slots).

The other OFDM symbol area except the N OFDM symbols, there are the following several eMBB transmission methods.

Method One

When resources belonging to a group of OFDM symbols are occupied by URLLC, eMBB data (including RS) corresponding to the resources is not transmitted because the basic DMRS of the eMBB is transmitted on the N OFDM symbols. The basic DMRS resides at the head of a time slot for guaranteeing the accuracy of channel estimation for data demodulation of UEs with a slower moving speed. For UEs with a faster moving speed, an extra DMRS may be added in the time domain in addition to the basic DMRS to guarantee the accuracy of channel estimation for data demodulation of the UEs with a faster moving speed.

Method Two

When a scheduled eMBB resources belonging to a group of OFDM symbols are occupied by URLLC, the eMBB data (including RS, e.g., DMRS, CSI-RS, etc.) is transmitted in turn on subsequent resources not occupied by the URLLC. After resources within one time slot (or multiple time slots, e.g., when time slots are aggregated) are used up, remaining eMBB data is not transmitted on the currently scheduled resources. For example, as shown in FIG. 15, in a time slot, 14 OFDM symbols are scheduled for transmitting eMBB. When OFDM symbols 5, 6, 7 are occupied by URLLC, eMBB data (including RS) scheduled on OFDM symbol 5 is transmitted on OFDM symbol 8 which is not occupied, the other eMBB data scheduled on other OFDM symbols is transmitted on subsequent OFDM symbols, and eMBB data scheduled on OFDM symbols 11, 12, 13 is not transmitted in the current time slot.

In addition, when a time domain spread spectrum RS exists and the eMBB data (including RS) are shifted to be transmitted in subsequent resources according to the above processing manner when the eMBB resources are occupied by URLLC, the time domain spread spectrum RS may be transmitted on resources in which there is an interval larger than P OFDM symbols (P is a positive integer, may be pre-determined, e.g., P may be 1, the P OFDM symbols are P successive OFDM symbols), but such transmission is not allowed. As shown in FIG. 16, OFDM symbol 4 and OFDM symbol 5 is a time domain spread spectrum DMRS, when OFDM symbol 5 is occupied by URLLC, the DMRS scheduled on OFDM symbol 5 is shifted to be transmitted on OFDM symbol 8. As such, the time domain spread spectrum DMRS is transmitted on resources in which there is an interval of 4 OFDM symbols. The channels may not be orthogonal to each other due to the change in time domain, thus the transmission is not allowed. Given that the above transmission manner is not allowed, relative positions of OFDM symbols for transmitting RS may be changed so that the time domain spread spectrum RS is not transmitted on resources in which there is an interval larger than P symbols. For example, as shown in FIG. 17, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 3, and the DMRS scheduled on OFDM symbol 5 is transmitted on OFDM symbol 4. As such, the time domain spread spectrum DMRS is transmitted in two consecutive OFDM symbols. Alternatively, as shown in FIG. 18, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 8, and the DMRS scheduled on OFDM symbol 5 is transmitted on OFDM symbol 9. As such, the time domain spread spectrum DMRS is transmitted in two consecutive OFDM symbols.

Method Three

According to this method, the transmission manner of eMBB is determined according to whether RS transmission is scheduled on the eMBB resources occupied by URLLC. Specifically, when resources belonging to a group of OFDM symbols are occupied by URLLC and only data transmission is scheduled on eMBB resources corresponding to the occupied resources and no RS is scheduled, the eMBB data is not transmitted, as shown in FIG. 19.

When resources belonging to a group of OFDM symbols are occupied by URLLC and RS transmission is scheduled on eMBB resources corresponding to the occupied resources, data scheduled on the eMBB resources and subsequent data is transmitted in turn on subsequent eMBB resources not occupied by URLLC, as shown in FIG. 20. After all of resources within a time slot (or multiple time slots, e.g., aggregated time slots) are used up, the remaining data is not transmitted on the currently scheduled resources. For example, as shown in FIG. 15, in a time slot, 14 OFDM symbols are scheduled for transmitting eMBB. When OFDM symbols 5, 6, 7 are occupied by URLLC, eMBB data (including RS) scheduled on OFDM symbol 5 is transmitted on OFDM symbol 8 which is not occupied, the other eMBB data scheduled on other OFDM symbols is transmitted on subsequent OFDM symbols, and eMBB data scheduled on OFDM symbols 11, 12, 13 is not transmitted in the current time slot.

In addition, when RS transmission is scheduled on the eMBB resources occupied by URLLC and the eMBB data (including RS) are shifted to be transmitted in subsequent resources according to the above processing manner when the eMBB resources are occupied by URLLC, the time domain spread spectrum RS may be transmitted on resources in which there is an interval larger than P OFDM symbols (P is a positive integer, may be pre-determined, e.g., P may be 1, the P OFDM symbols are successive OFDM symbols), but such transmission is not allowed. As shown in FIG. 16, OFDM symbol 4 and OFDM symbol 5 is a time domain spread spectrum DMRS, when OFDM symbol 5 is occupied by URLLC, the DMRS scheduled on OFDM symbol 5 is shifted to be transmitted on OFDM symbol 8. As such, the time domain spread spectrum DMRS is transmitted on resources in which there is an interval of 4 OFDM symbols. The channels may not be orthogonal to each other due to the change in time domain, thus the transmission is not allowed. Given that the above transmission manner is not allowed, relative positions of OFDM symbols for transmitting RS may be changed so that the time domain spread spectrum RS is not transmitted on resources in which there is an interval larger than P symbols. For example, as shown in FIG. 17, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 3, and the DMRS scheduled on OFDM symbol 5 is transmitted on OFDM symbol 4. As such, the time domain spread spectrum DMRS is transmitted in two consecutive OFDM symbols. Alternatively, as shown in FIG. 18, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 8, and the DMRS scheduled on OFDM symbol 5 is transmitted on OFDM symbol 9. As such, the time domain spread spectrum DMRS is transmitted in two consecutive OFDM symbols.

Method Four

According to this method, the transmission manner of eMBB is determined according to whether RS transmission is scheduled on the eMBB resources occupied by URLLC. Specifically, when resources belonging to a group of OFDM symbols are occupied by URLLC and only data transmission is scheduled on eMBB resources corresponding to the occupied resources and no RS is scheduled, the eMBB data is not transmitted, as shown in FIG. 19.

When resources belonging to a group of OFDM symbols are occupied by URLLC and RS transmission is scheduled on eMBB resources corresponding to the occupied resources, it may be judged whether eMBB data scheduled on the first group of OFDM symbols not occupied by URLLC subsequent to the OFDM symbol includes RS. When the eMBB data does not include RS, the eMBB data scheduled on the resources occupied by URLLC and subsequent data is transmitted in turn on eMBB resources not occupied by URLLC following the resources occupied by URLLC. When the eMBB data includes RS, a first priority level of the RS scheduled on OFDM symbols occupied by URLLC may be compared with a second priority level of RS scheduled on the first group of OFDM symbols not occupied by URLLC subsequent to the OFDM symbols occupied by URLLC. If the first priority level is higher than the second priority level (e.g., the priority level of DMRS is higher than the priority level of CSI-RS), the eMBB data scheduled on the resources occupied by URLLC and subsequent data may be transmitted in turn on subsequent eMBB resources having the closest proximity to the resources occupied by URLLC. If the first priority level is not larger than the second priority level, the eMBB data scheduled on the resources occupied by URLLC is not to be transmitted. As shown in FIG. 21. After all of resources within a time slot (or multiple time slots, e.g., aggregated time slots) are used up, the remaining data is not transmitted on the currently scheduled resources. For example, as shown in FIG. 15, in a time slot, 14 OFDM symbols are scheduled for transmitting eMBB. When OFDM symbols 5, 6, 7 are occupied by URLLC, eMBB data (including RS) scheduled on OFDM symbol 5 is transmitted on OFDM symbol 8 which is not occupied, the other eMBB data scheduled on other OFDM symbols is transmitted on subsequent OFDM symbols, and eMBB data scheduled on OFDM symbols 11, 12, 13 is not transmitted in the current time slot.

In addition, when eMBB data scheduled on resources occupied by URLLC is transmitted on subsequent resources and includes a time domain spread spectrum RS, the eMBB data (including RS) are shifted to be transmitted in subsequent resources according to the above processing manner when the eMBB resources are occupied by URLLC, the time domain spread spectrum RS may be transmitted on resources in which there is an interval larger than P OFDM symbols (P is a positive integer, may be pre-determined, e.g., P may be 1, the P OFDM symbols are successive OFDM symbols), but such transmission is not allowed. As shown in FIG. 16, OFDM symbol 4 and OFDM symbol 5 is a time domain spread spectrum DMRS, when OFDM symbol 5 is occupied by URLLC, the DMRS scheduled on OFDM symbol 5 is shifted to be transmitted on OFDM symbol 8. As such, the time domain spread spectrum DMRS is transmitted on resources in which there is an interval of 4 OFDM symbols. The channels may not be orthogonal to each other due to the change in time domain, thus the transmission is not allowed. Given that the above transmission manner is not allowed, relative positions of OFDM symbols for transmitting RS may be changed so that the time domain spread spectrum RS is not transmitted on resources in which there is an interval larger than P symbols. For example, as shown in FIG. 17, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 3, and the DMRS scheduled on OFDM symbol 5 is transmitted on OFDM symbol 4. As such, the time domain spread spectrum DMRS is transmitted in two consecutive OFDM symbols. Alternatively, as shown in FIG. 18, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 8, and the DMRS scheduled on OFDM symbol 5 is transmitted on OFDM symbol 9. As such, the time domain spread spectrum DMRS is transmitted in two consecutive OFDM symbols.

Method Five

Within a time slot, a group of OFDM symbols (including N OFDM symbols, N is a positive integer, is pre-determined in a protocol or configured by higher layer signaling) including all of eMBB resources for transmitting RS (or DMRS) is not to be occupied by URLLC. As such, RS of eMBB is not to be occupied by URLLC, and the channel estimation of eMBB is not to be affected. The UE does not have to perform blind detection of URLLC scheduling within the group of OFDM symbols because URLLC is not to be scheduled in the group of OFDM symbols to avoid RS being occupied by the URLLC. When eMBB data scheduled on resources occupied by URLLC does not include RS, the eMBB data is not transmitted.

Method Six

Within a time slot, a group of OFDM symbols (including N OFDM symbols, N is a positive integer, is pre-determined in a protocol or configured by higher layer signaling) including eMBB resources for transmitting a pre-determined type of RS (e.g., DMRS, or CSI-RS) is not to be occupied by URLLC. As such, RS of eMBB is not to be occupied by URLLC, and the channel estimation of eMBB is not to be affected. The UE does not have to perform blind detection of URLLC scheduling within the group of OFDM symbols because URLLC is not to be scheduled in the group of OFDM symbols to avoid RS being occupied by the URLLC. When eMBB data scheduled on resources occupied by URLLC does not include the pre-determined type of RS, the eMBB data is not transmitted.

Method Seven

When a group of OFDM symbols including eMBB resources for transmitting RS (e.g., DMRS or CSI-RS) is occupied by URLLC, RS of eMBB may be transmitted on scheduled OFDM symbols using a subcarrier spacing of the URLLC, and URLLC occupies resources not used by the eMBB RS.

The above are seven methods for transmitting eMBB of various embodiments. After determining a method for transmitting eMBB, a UE may receive eMBB data according to the determined method.

Embodiment Two

According to this embodiment, on scheduled eMBB resources occupied by URLLC, subcarrier spacing of all of eMBB resources within a time slot may all be occupied by URLLC, and a subcarrier spacing may be changed when occupied. All of OFDM symbols within a time slot (or multiple time slots, e.g., aggregated time slots) may be divided into M groups. The number of OFDM symbols in each group is Lm. OFDM symbols within one group have the same subcarrier spacing. The length of an OFDM symbol is obtained using a pre-determined subcarrier spacing, e.g., according to the subcarrier spacing of eMBB.

The following are several methods for transmitting eMBB.

Method One

When resources belonging to a group of OFDM symbols are occupied by URLLC, eMBB data (including RS) scheduled on the occupied resources is not transmitted.

Method Two

When scheduled eMBB resources belonging to a group of OFDM symbols are occupied by URLLC, the eMBB data (including RS, e.g., DMRS, CSI-RS, etc.) is transmitted in turn on subsequent resources not occupied by the URLLC. After resources within one time slot (or multiple time slots, e.g., aggregated time slots) are used up, remaining eMBB data is not transmitted on the currently scheduled resources. For example, as shown in FIG. 15, in a time slot, 14 OFDM symbols are scheduled for transmitting eMBB. When OFDM symbols 5, 6, 7 are occupied by URLLC, eMBB data (including RS) scheduled on OFDM symbol 5 is transmitted on OFDM symbol 8 which is not occupied, the other eMBB data scheduled on other OFDM symbols is transmitted on subsequent OFDM symbols, and eMBB data scheduled on OFDM symbols 11, 12, 13 is not transmitted in the current time slot.

In addition, when a time domain spread spectrum RS exists and the eMBB data (including RS) are shifted to be transmitted in subsequent resources according to the above processing manner when the eMBB resources are occupied by URLLC, the time domain spread spectrum RS may be transmitted on resources in which there is an interval larger than P OFDM symbols (P is a positive integer, may be pre-determined, e.g., P may be 1, the P OFDM symbols are successive OFDM symbols), but such transmission is not allowed. As shown in FIG. 16, OFDM symbol 4 and OFDM symbol 5 is a time domain spread spectrum DMRS, when OFDM symbol 5 is occupied by URLLC, the DMRS scheduled on OFDM symbol 5 is shifted to be transmitted on OFDM symbol 8. As such, the time domain spread spectrum DMRS is transmitted on resources in which there is an interval of 4 OFDM symbols. The channels may not be orthogonal to each other due to the change in time domain, thus the transmission is not allowed. Given that the above transmission manner is not allowed, relative positions of OFDM symbols for transmitting RS may be changed so that the time domain spread spectrum RS is not transmitted on resources in which there is an interval larger than P symbols. For example, as shown in FIG. 17, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 3, and the DMRS scheduled on OFDM symbol 5 is transmitted on OFDM symbol 4. As such, the time domain spread spectrum DMRS is transmitted in two consecutive OFDM symbols. Alternatively, as shown in FIG. 18, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 8, and the DMRS scheduled on OFDM symbol 5 is transmitted on OFDM symbol 9. As such, the time domain spread spectrum DMRS is transmitted in two consecutive OFDM symbols.

Method Three

According to this method, the transmission manner of eMBB is determined according to whether RS transmission is scheduled on the eMBB resources occupied by URLLC. Specifically, when resources belonging to a group of OFDM symbols are occupied by URLLC and only data transmission is scheduled on eMBB resources corresponding to the occupied resources and no RS is scheduled, the eMBB data is not transmitted, as shown in FIG. 19.

When resources belonging to a group of OFDM symbols are occupied by URLLC and RS transmission is scheduled on eMBB resources corresponding to the occupied resources, data scheduled on the eMBB resources and subsequent data is transmitted in turn on subsequent eMBB resources not occupied by URLLC, as shown in FIG. 20. After all of resources within a time slot (or multiple time slots, e.g., aggregated time slots) are used up, the remaining data is not transmitted on the currently scheduled resources. For example, as shown in FIG. 15, in a time slot, 14 OFDM symbols are scheduled for transmitting eMBB. When OFDM symbols 5, 6, 7 are occupied by URLLC, eMBB data (including RS) scheduled on OFDM symbol 5 is transmitted on OFDM symbol 8 which is not occupied, the other eMBB data scheduled on other OFDM symbols is transmitted on subsequent OFDM symbols, and eMBB data scheduled on OFDM symbols 11, 12, 13 is not transmitted in the current time slot.

In addition, when RS transmission is scheduled on the eMBB resources occupied by URLLC and the eMBB data (including RS) are shifted to be transmitted in subsequent resources according to the above processing manner when the eMBB resources are occupied by URLLC, the time domain spread spectrum RS may be transmitted on resources in which there is an interval larger than P OFDM symbols (P is a positive integer, may be pre-determined, e.g., P may be 1, the P OFDM symbols are successive OFDM symbols), but such transmission is not allowed. As shown in FIG. 16, OFDM symbol 4 and OFDM symbol 5 is a time domain spread spectrum DMRS, when OFDM symbol 5 is occupied by URLLC, the DMRS scheduled on OFDM symbol 5 is shifted to be transmitted on OFDM symbol 8. As such, the time domain spread spectrum DMRS is transmitted on resources in which there is an interval of 4 OFDM symbols. The channels may not be orthogonal to each other due to the change in time domain, thus the transmission is not allowed. Given that the above transmission manner is not allowed, relative positions of OFDM symbols for transmitting RS may be changed so that the time domain spread spectrum RS is not transmitted on resources in which there is an interval larger than P symbols. For example, as shown in FIG. 17, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 3, and the DMRS scheduled on OFDM symbol 5 is transmitted on OFDM symbol 4. As such, the time domain spread spectrum DMRS is transmitted in two consecutive OFDM symbols. Alternatively, as shown in FIG. 18, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 8, and the DMRS scheduled on OFDM symbol 5 is transmitted on OFDM symbol 9. As such, the time domain spread spectrum DMRS is transmitted in two consecutive OFDM symbols.

Method Four

According to this method, the transmission manner of eMBB is determined according to whether RS transmission is scheduled on the eMBB resources occupied by URLLC. Specifically, when resources belonging to a group of OFDM symbols are occupied by URLLC and only data transmission is scheduled on eMBB resources corresponding to the occupied resources and no RS is scheduled, the eMBB data is not transmitted, as shown in FIG. 19.

When resources belonging to a group of OFDM symbols are occupied by URLLC and RS transmission is scheduled on eMBB resources corresponding to the occupied resources, it may be judged whether eMBB data scheduled on the first group of OFDM symbols not occupied by URLLC subsequent to the OFDM symbol includes RS. When the eMBB data does not include RS, the eMBB data scheduled on the resources occupied by URLLC and subsequent data is transmitted in turn on eMBB resources not occupied by URLLC following the resources occupied by URLLC. When the eMBB data includes RS, a first priority level of the RS scheduled on OFDM symbols occupied by URLLC may be compared with a second priority level of RS scheduled on the first group of OFDM symbols not occupied by URLLC subsequent to the OFDM symbols occupied by URLLC. If the first priority level is higher than the second priority level (e.g., the priority level of DMRS is higher than the priority level of CSI-RS), the eMBB data scheduled on the resources occupied by URLLC and subsequent data may be transmitted in turn on subsequent eMBB resources having the closest proximity to the resources occupied by URLLC. If the first priority level is not larger than the second priority level, the eMBB data scheduled on the resources occupied by URLLC is not to be transmitted. As shown in FIG. 21. After all of resources within a time slot (or multiple time slots, e.g., aggregated time slots) are used up, the remaining data is not transmitted on the currently scheduled resources. For example, as shown in FIG. 15, in a time slot, 14 OFDM symbols are scheduled for transmitting eMBB. When OFDM symbols 5, 6, 7 are occupied by URLLC, eMBB data (including RS) scheduled on OFDM symbol 5 is transmitted on OFDM symbol 8 which is not occupied, the other eMBB data scheduled on other OFDM symbols is transmitted on subsequent OFDM symbols, and eMBB data scheduled on OFDM symbols 11, 12, 13 is not transmitted in the current time slot.

In addition, when eMBB data scheduled on resources occupied by URLLC is transmitted on subsequent resources and includes a time domain spread spectrum RS, the eMBB data (including RS) are shifted to be transmitted in subsequent resources according to the above processing manner when the eMBB resources are occupied by URLLC, the time domain spread spectrum RS may be transmitted on resources in which there is an interval larger than P OFDM symbols (P is a positive integer, may be pre-determined, e.g., P may be 1, the P OFDM symbols are successive OFDM symbols), but such transmission is not allowed. As shown in FIG. 16, OFDM symbol 4 and OFDM symbol 5 is a time domain spread spectrum DMRS, when OFDM symbol 5 is occupied by URLLC, the DMRS scheduled on OFDM symbol 5 is shifted to be transmitted on OFDM symbol 8. As such, the time domain spread spectrum DMRS is transmitted on resources in which there is an interval of 4 OFDM symbols. The channels may not be orthogonal to each other due to the change in time domain, thus the transmission is not allowed. Given that the above transmission manner is not allowed, relative positions of OFDM symbols for transmitting RS may be changed so that the time domain spread spectrum RS is not transmitted on resources in which there is an interval larger than P symbols. For example, as shown in FIG. 17, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 3, and the DMRS scheduled on OFDM symbol 5 is transmitted on OFDM symbol 4. As such, the time domain spread spectrum DMRS is transmitted in two consecutive OFDM symbols. Alternatively, as shown in FIG. 18, the transmission location of RS is advanced so that the time domain spread spectrum RS is not transmitted on resources in which there is an interval larger than P symbols. OFDM symbols 4 and 5 are scheduled for transmitting a time domain spread spectrum DMRS. When OFDM symbol 5 is occupied by URLLC, the DMRS scheduled on OFDM symbol 4 is transmitted on OFDM symbol 8, and the DMRS scheduled on OFDM symbol 5 is transmitted on OFDM symbol 9. As such, the time domain spread spectrum DMRS is transmitted in two consecutive OFDM symbols.

Method Five

When a group of OFDM symbols including eMBB resources for transmitting RS (e.g., DMRS or CSI-RS) is occupied by URLLC, RS of eMBB may be transmitted on scheduled OFDM symbols using a subcarrier spacing of the URLLC, and URLLC occupies resources not used by the eMBB RS.

Method Six

Within a time slot, when OFDM symbols corresponding to eMBB resources for transmitting RS (e.g., DMRS, or CSI-RS) are occupied by URLLC, the data and RS of the eMBB are not to be transmitted on the resources occupied by URLLC and subsequent resources. As such, the base station and the terminal can avoid wasting resources in subsequent eMBB data reception because the eMBB cannot be correctly detected without RS even if reception is performed.

The above are six methods for eMBB transmission of various embodiments. After determining a method for transmitting eMBB, a UE may receive eMBB data according to the determined method.

In addition, the RS mentioned herein may be DMRS, or CSI-RS, or DMRS and CSI-RS.

Embodiment Three

According to this embodiment, on scheduled eMBB resources occupied by URLLC, subcarrier spacing of all of eMBB resources within a time slot may all be occupied by URLLC, and a subcarrier spacing may be changed when occupied. All of OFDM symbols within a time slot (or multiple time slots, e.g., aggregated time slots) may be divided into M groups. The number of OFDM symbols in each group is Lm. OFDM symbols within one group have the same subcarrier spacing. The length of an OFDM symbol is obtained using a pre-determined subcarrier spacing, e.g., according to the subcarrier spacing of eMBB. When a group of OFDM symbols is occupied by URLLC, the size of the subcarrier spacing of the group of OFDM symbols is the size of the subcarrier spacing of URLLC. When a group of OFDM symbols is not occupied by URLLC, the size of the subcarrier spacing of the group of OFDM symbols is the size of the subcarrier spacing of eMBB.

Each group of OFDM symbols includes DMRS, and data in each group of OFDM symbols are processed through channel estimation using DMRS in the group of OFDM symbol and then demodulated. When eMBB resources are occupied by URLLC, the minimum unit of eMBB resources that can be occupied by URLLC is a group of OFDM symbols. As such, when eMBB resources belonging to a group of OFDM symbols are occupied by URLLC, eMBB data scheduled on the group of OFDM symbols is not to be transmitted, and eMBB data scheduled on eMBB resources not occupied by URLLC is still transmitted. Since each group includes DMRS, the group is not to be affected by the occupation of other groups by URLLC.

According to the method, DMRS is in unit of symbol groups, the channel estimation for demodulating eMBB data is not to be affected by occupation of DMRS by URLLC. Compared with the method where DMRS is in unit of time slots, this method may have increased DMRS overhead in eMBB transmission. The UE may obtain information about whether DMRS in scheduled eMBB data is in unit of time slots or in unit of OFDM symbol groups from configurations by higher layer signaling or physical layer signaling or MAC layer signaling. As such, the UE can identify DMRS in unit of time slots (e.g., not all of OFDM symbol groups include DMRS as shown in FIG. 22, as in embodiment one and embodiment two) and DMRS in unit of OFDM symbol groups (e.g., each OFDM symbol group includes DMRS as shown in FIG. 23, as in embodiment three).

The above are several embodiments of the data receiving method of the present application. The present disclosure also provides a data receiving apparatus which can implement the above data receiving method. FIG. 24 is a schematic diagram illustrating the structure of the apparatus. As shown in FIG. 24, the apparatus may include: an occupation determining unit and a receiving unit.

The occupation determining unit is configured for making a determination that resources scheduled for a category-2 service has been occupied by a category-1 service. The receiving unit is configured for receiving data of the category-2 service from the occupied resources of the category-2 service according to information about scheduling of category-1 service data.

FIG. 25 is another flowchart illustrating a data receiving method in an NR system according to the present application.

Referring to FIG. 25, in step 2501, the terminal identifies that resources for a category-2 service are occupied by a category-1 service.

In some embodiments, in a time domain unit, a first plurality of symbols are designated into one group, a second plurality of symbols other than the first plurality of symbols are divided into a plurality of groups. If the plurality of groups are occupied by the category-1 service, the first plurality of symbols of the group uses a subcarrier spacing of the category-2 service and the second plurality of symbols of the plurality of groups use a subcarrier spacing of the category-1 service. If the plurality of groups are not occupied by a category-1 service, the second plurality of symbols and the first plurality of symbols use a subcarrier spacing of the category-2 service.

In some embodiments, if the category-2 service uses a pre-defined type of a reference signal (RS), a symbol for transmitting the RS of the group or the plurality of groups is scheduled and is not occupied by a category-1 service. The subcarrier spacing of the category-1 service is different from the subcarrier spacing of the category-2 service.

In some embodiments, all symbols for the category-2 service in a time domain unit are divided into a plurality of groups. If the plurality of groups are occupied by the category-1 service, the plurality of groups use a subcarrier spacing of the category-1 service. If the plurality of groups are not occupied by the category-1 service, the plurality of groups use a subcarrier spacing of the category-2 service.

In some embodiments, a group among the plurality of groups includes a reference signal (RS). The data for the category-2 service transmitted on the group is estimated and demodulated using the RS.

In some embodiments, the terminal identifies whether the RS is in unit of the group among the plurality of groups based on at least one of higher layer signaling, an indication in physical layer signaling, and an indication in media access control (MAC) layer signaling.

In step 2503, the terminal receives data of the category-2 service according to the occupied resources by the category-1 service.

In some embodiments, the first plurality of symbols are not occupied by a category-1 service. The terminal determines at least one group for the category-2 service from the plurality of groups. The terminal receives the data based on the determined at least one group.

In some embodiments, if a second group among the plurality of groups is occupied by the category-1 service, the terminal determines whether first data for the category-2 service scheduled on a first group among the plurality of groups not occupied by the category-1 service subsequent to the second group includes a RS if second data for the category-2 service scheduled on the second group includes another RS. The terminal transmits the second data and subsequent data for the category-2 service at the first group if the first data does not include the RS. The terminal compares a first priority level of the RS with a second priority level of the another RS if the first data includes the RS and transmitting the second data and the subsequent data at the first group if the second priority level is higher than the first priority level. The second data is not transmitted if the first priority level is higher than the second priority level.

In some embodiments, the terminal adjusts a position of a symbol for transmitting a reference signal (RS) from the second group to the first group. The RS is not transmitted on the occupied resources by the category-1 service, if the data scheduled on the second group includes the RS.

In some embodiments, if a second group among the plurality of groups is occupied by the category-1 service, the terminal transmits first data scheduled on a first group among the plurality of groups not occupied by the category-1 service. Second data scheduled on the second group is not transmitted.

In some embodiments, if a first group among the plurality of groups is occupied by the category-1 service, the terminal transmits the data on a second group among the plurality of groups not occupied by a category-2 service. The data is not transmitted on the first group.

In some embodiments, if a second group among the plurality of groups is occupied by the category-1 service, the terminal transmits a reference signal (RS) for the category-2 service scheduled on the second group using the subcarrier spacing of the category-1 service, if the data scheduled on the second group includes the RS.

In some embodiments, if a second group among the plurality of groups is occupied by the category-1 service, the terminal transmits the data at a first group among the plurality of groups not occupied by the category-1 service subsequent to the second group.

In some embodiments, if a second group among the plurality of groups is occupied by the category-1 service, the terminal transmits the data scheduled on the second group and subsequent data for the category-2 service at a first group among the plurality of groups not occupied by the category-1 service subsequent to the second group, if the data includes a reference signal.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a terminal in a wireless communication system, the method comprising:
   receiving scheduling information for a first service;
   identifying that at least one resource is occupied for the first service among resources scheduled for a second service based on the received scheduling information; and
   in case that a scheduled symbol for a reference signal (RS) of the second service is occupied by the first service:
      identifying a transmission symbol for the RS of the second service by using remaining resources among the resources, based on the at least one resource for the first service, and
      receiving data for the second service according to the identified transmission symbol for the RS of the second service,
   wherein a priority of the first service is higher than a priority of the second service,
   wherein the transmission symbol for the RS of the second service is not occupied by the first service, and
   wherein the resources scheduled for the second service include the scheduled symbol for the RS of the second service.

2. The method of claim 1, wherein a first plurality of symbols is designated into a group, a second plurality of symbols other than the first plurality of symbols is divided into a plurality of groups,
   wherein, if the plurality of groups is occupied by the first service, the first plurality of symbols of the group corresponds to a subcarrier spacing of the second service and the second plurality of symbols of the plurality of groups corresponds to a subcarrier spacing of the first service, and
   wherein, if the plurality of groups is not occupied by a first service,
   the second plurality of symbols and the first plurality of symbols correspond to a subcarrier spacing of the second service.

3. The method of claim 2, wherein, if the second service uses a pre-defined type of a RS, a symbol for transmitting the pre-defined type of the RS of the group or the plurality of groups is scheduled and is not occupied by the first service, and
   wherein the subcarrier spacing of the first service is different from the subcarrier spacing of the second service.

4. The method of claim 2, wherein, if a second group among the plurality of groups is occupied by the first service, the receiving the data for the second service comprises:
   determining whether first data for the second service scheduled on a first group among the plurality of groups not occupied by the first service subsequent to the second group includes the RS if second data for the second service scheduled on the second group includes another RS;
   receiving the second data and subsequent data for the second service at the first group if the first data does not include the RS; and
   comparing a first priority level of the RS with a second priority level of the another RS if the first data includes the RS and receiving the second data and the subsequent data at the first group if the second priority level is higher than the first priority level, and
wherein the second data is not transmitted if the first priority level is higher than the second priority level.

5. The method of claim 2, wherein, if a second group among the plurality of groups is occupied by the first service, the receiving the data for the second service comprises: receiving first data scheduled on a first group among the plurality of groups not occupied by the first service, and
wherein second data scheduled on the second group is not transmitted.

6. The method of claim 2, wherein, if a first group among the plurality of groups is occupied by the first service, the receiving the data for the second service comprises: receiving the data on a second group among the plurality of groups not occupied by a second service, and
wherein the data scheduled on the first group is not transmitted.

7. The method of claim 2, wherein, if a second group among the plurality of groups is occupied by the first service, the receiving the data for the second service comprises: receiving the RS of the second service scheduled on the second group using the subcarrier spacing of the first service, if the data scheduled on the second group includes the RS.

8. The method of claim 2, wherein, if a second group among the plurality of groups is occupied by the first service, the receiving the data for the second service comprises: receiving the data scheduled on a first group among the plurality of groups not occupied by the first service subsequent to the second group.

9. The method of claim 2, wherein, if a second group among the plurality of groups is occupied by the first service, the receiving the data for the second service comprises: receiving the data scheduled on the second group and subsequent data for the second service at a first group among the plurality of groups not occupied by the first service subsequent to the second group, if the data includes the RS.

10. The method of claim 1, wherein all symbols for the second service in a time domain unit are divided into a plurality of groups,
wherein, if the plurality of groups is occupied by the first service, the plurality of groups corresponds to a subcarrier spacing of the first service,
wherein, if the plurality of groups is not occupied by the first service, the plurality of groups corresponds to a subcarrier spacing of the second service,
wherein a group among the plurality of groups includes the RS,
wherein the data for the second service transmitted on the group is estimated and demodulated using the RS, and
wherein the method further comprises identifying whether the RS is in unit of the group among the plurality of groups based on at least one of a higher layer signaling, an indication in a physical layer signaling, and an indication in a media access control (MAC) layer signaling.

11. The method of claim 1, wherein the RS includes a demodulation reference signal (DMRS).

12. The method of claim 1, further comprising, in case that the scheduled symbol for the RS of the second service is not occupied by the first service, receiving the data for the second service according to the scheduled symbol for the RS of the second service.

13. The method of claim 1, further comprising, in case that the at least one resource is occupied for the first service, determining a subcarrier spacing of the at least one resource to a subcarrier spacing of the first service, wherein the subcarrier spacing of the first service is different from a subcarrier spacing of the second service.

14. An apparatus of a terminal in a wireless communication system, the apparatus comprising:
a transceiver; and
at least one processor operably coupled to the transceiver, wherein the at least one processor is configured to:
receive scheduling information for a first service,
identify that at least one resource is occupied for the first service among resources scheduled for a second service based on the received scheduling information, and
in case that a scheduled symbol for a reference signal (RS) of the second service is occupied by the first service:
identify a transmission symbol for the RS of the second service based on the at least one resource for the first service, and
receiving data for the second service according to the identified transmission symbol for the RS of the second service,
wherein a priority of the first service is higher than a priority of the second service,
wherein the transmission symbol for the RS of the second service is not occupied by the first service, and
wherein the resources scheduled for the second service include the scheduled symbol for the RS of the second service.

15. The apparatus of claim 14, wherein, in a time domain unit, a first plurality of symbols is designated into a group, a second plurality of symbols other than the first plurality of symbols is divided into a plurality of groups,
wherein, if the plurality of groups is occupied by the first service, the first plurality of symbols of the group corresponds to a subcarrier spacing of the second service and the second plurality of symbols of the plurality of groups corresponds to a subcarrier spacing of the first service, and
wherein, if the plurality of groups is not occupied by a first service, the second plurality of symbols and the first plurality of symbols corresponds to a subcarrier spacing of the second service.

16. The apparatus of claim 15, wherein, if the second service uses a pre-defined type of a RS, a symbol for transmitting the pre-defined type of the RS of the group or the plurality of groups is scheduled and is not occupied by the first service, and
wherein the subcarrier spacing of the first service is different from the subcarrier spacing of the second service.

17. The apparatus of claim 15, wherein, if a second group among the plurality of groups is occupied by the first service, in order to receive the data for the second service, the at least one processor is further configured to:
determine whether first data for the second service scheduled on a first group among the plurality of groups not occupied by the first service subsequent to the second group includes the RS if second data for the second service scheduled on the second group includes another RS,
receive the second data and subsequent data for the second service at the first group if the first data does not include the RS, and
compare a first priority level of the RS with a second priority level of the another RS if the first data includes the RS and receive the second data and the subsequent data at the first group if the second priority level is higher than the first priority level, and wherein the second data is not transmitted if the first priority level is higher than the second priority level.

18. The apparatus of claim 15, wherein, if a second group among the plurality of groups is occupied by the first service, in order to receive the data for the second service, the at least one processor is further configured to: receive first data scheduled on a first group among the plurality of groups not occupied by the first service, and wherein second data scheduled on the second group is not transmitted.

19. The apparatus of claim 15, wherein, if a first group among the plurality of groups is occupied by the first service, in order to receive the data for the second service, the at least one processor is further configured to: receive the data on a second group among the plurality of groups not occupied by a second service, and wherein the data scheduled on the first group is not transmitted.

20. The apparatus of claim 15, wherein, if a second group among the plurality of groups is occupied by the first service, in order to receive the data for the second service, the at least one processor is further configured to: receive the RS of the second service scheduled on the second group using the subcarrier spacing of the first service, if the data scheduled on the second group includes the RS.

21. The apparatus of claim 15, wherein, if a second group among the plurality of groups is occupied by the first service, in order to receive the data for the second service, the at least one processor is further configured to: receive the data scheduled on a first group among the plurality of groups not occupied by the first service subsequent to the second group.

22. The apparatus of claim 15, wherein, if a second group among the plurality of groups is occupied by the first service, in order to receive the data for the second service, the at least one processor is further configured to: receive the data scheduled on the second group and subsequent data for the second service at a first group among the plurality of groups not occupied by the first service subsequent to the second group, if the data includes the RS.

23. The apparatus of claim 14, wherein all symbols for the second service in a time domain unit are divided into a plurality of groups, wherein, if the plurality of groups is occupied by the first service, the plurality of groups corresponds to a subcarrier spacing of the first service, wherein, if the plurality of groups is not occupied by the first service, the plurality of groups corresponds to a subcarrier spacing of the second service, wherein a group among the plurality of groups includes the RS, wherein the data for the second service transmitted on the group is estimated and demodulated using the RS, and wherein the at least one processor is further configured to identify whether the RS is in unit of the group among the plurality of groups based on at least one of a higher layer signaling, an indication in a physical layer signaling, and an indication in a media access control (MAC) layer signaling.

24. The apparatus of claim 14, wherein the RS includes a demodulation reference signal (DMRS).

25. The apparatus of claim 14, wherein the at least one processor is further configured to: in case that the scheduled symbol for the RS of the second service is not occupied by the first service, receiving the data for the second service according to the scheduled symbol for the RS of the second service.

26. The apparatus of claim 14, wherein the at least one processor is further configured to: in case that the at least one resource is occupied for the first service, determine a subcarrier spacing of the at least one resource to a subcarrier spacing of the first service, wherein the subcarrier spacing of the first service is different from a subcarrier spacing of the second service.

\* \* \* \* \*